United States Patent
Heyring et al.

(10) Patent No.: US 6,217,047 B1
(45) Date of Patent: Apr. 17, 2001

(54) PASSIVE VEHICULAR SUSPENSION SYSTEM INCLUDING A ROLL CONTROL MECHANISM

(75) Inventors: Christopher B. Heyring, Eagle Bay; Richard Monk, Dunsborough; Michael J Longman, Dunsborough; Alexander John Robertson, Dunsborough, all of (AU)

(73) Assignee: Kinetic Limited, Dunsborough (AU)

( * ) Notice: Subject to any disclaimer, the term of this patent is extended or adjusted under 35 U.S.C. 154(b) by 0 days.

(21) Appl. No.: 09/331,769

(22) PCT Filed: Dec. 23, 1997

(86) PCT No.: PCT/AU97/00870

§ 371 Date: Sep. 27, 1999

§ 102(e) Date: Sep. 27, 1999

(87) PCT Pub. No.: WO98/28160

PCT Pub. Date: Jul. 2, 1998

(30) Foreign Application Priority Data

Dec. 24, 1996 (AU) .................................................. PO 4355
Jul. 28, 1997 (AU) .................................................. PO 8284

(51) Int. Cl.[7] .................................................. B60G 21/05
(52) U.S. Cl. .................................................. 280/124.106
(58) Field of Search .................................................. 280/124.106

(56) References Cited

U.S. PATENT DOCUMENTS

| 2,099,819 | 11/1937 | Mercier . | |
|---|---|---|---|
| 4,550,926 | 11/1985 | MacIsaac . | |
| 5,074,582 | 12/1991 | Parsons . | |
| 5,161,822 | * 11/1992 | Lund | 280/124.106 |
| 5,447,332 | * 9/1995 | Heyring | 280/124.106 |
| 5,480,188 | * 1/1996 | Heyring | 280/124.106 |
| 5,529,324 | * 6/1996 | Krawczyk et al. | 280/124.106 |

FOREIGN PATENT DOCUMENTS

| 5827490 | 1/1991 | (AU) . |
|---|---|---|
| 1942095 | 10/1995 | (AU) . |
| 6726696 | 3/1997 | (AU) . |
| 512358A1 | 11/1992 | (EP) . |
| 865881 | 6/1941 | (FR) . |
| 926830 | 5/1963 | (GB) . |
| 2309948 | 8/1997 | (GB) . |
| 90 15727 | 12/1990 | (WO) . |
| 95 25020 | 9/1995 | (WO) . |
| 97 06971 | 2/1997 | (WO) . |

* cited by examiner

Primary Examiner—Kenneth R. Rice
(74) Attorney, Agent, or Firm—Birch, Stewart, Kolasch & Birch, LLP

(57) ABSTRACT

A suspension system is provided for a vehicle having a chassis supported on at least one front pair of laterally spaced wheels and at least one rear pair of laterally spaced wheels. The suspension system includes vehicle support devices for supporting the chassis above each pair of wheels, and roll moment reaction devices for providing location of the chassis about a substantially level roll attitude. The roll moment reaction devices include a respective roll attitude control mechanism for each pair of laterally spaced wheels for passively controlling the position of the wheels relative to each other and the chassis. Each roll attitude control mechanism is connected to at least one other roll attitude control mechanism by roll mechanism interconnection devices. The roll mechanism interconnection devices are arranged such that the roll moment reaction devices resist roll of the vehicle chassis with respect to the wheels, while simultaneously permitting cross-axle articulation motions of the wheels. The vehicle support devices for at least one pair of wheels include at least a first support for supporting at least a portion of the load on the vehicle support devices. The first support provides substantially zero roll stiffness of the vehicle. The roll moment reaction devices are separate devices from the vehicle support devices, thereby providing substantially zero load carrying capacity.

33 Claims, 13 Drawing Sheets

PASSIVE VEHICULAR SUSPENSION SYSTEM INCLUDING A ROLL CONTROL MECHANISM

This application is the national phase under 35 U.S.C. §371 of PCT International Application No. PCT/AU97/00870 which has an International filing date of Dec. 23, 1997 which designated the United States of America.

FIELD OF THE INVENTION

The present invention is generally related to vehicular suspension systems, and in particular to suspension systems incorporating roll control mechanisms.

DESCRIPTION OF THE BACKGROUND ART

The objectives of many suspension systems are to provide a high level of roll control, independent of the pitch and four wheel bounce stiffness rates, and also to provide control over the attitude of the body whilst providing a minimal stiffness to cross-axle articulation motions as the vehicle traverses rough terrain. These systems are especially suitable for use on vehicles which have high centres of mass and consequently experience high roll moments when cornering, so benefit from the combination of superior roll control, comfort and traction provided by suspension systems having the above characteristics.

One way that has been attempted for achieving the abovenoted suspension characteristics is to use active suspension systems which use fast-acting, closed loop control systems to determine how to modify their characteristics in response to ground surface inputs. This enables them to eliminate some of the compromises forced on the designers of conventional passive suspension systems and thereby achieve enhanced dynamic performance. The disadvantage of active systems is that they consume large amounts of power to provide a supply of fluid under pressure to drive the actuators as dictated by the control systems. The actuators are usually double acting hydraulic cylinders which are connected through control valves to the pressurised fluid supply or to a return to the reservoir. A hydropneumatic accumulator is often provided to reduce harshness and the need to operate the control valves for each cylinder for smaller wheel motion. To resist roll for example, fluid is supplied to the cylinders on one side of the vehicle. To return to level straight line running, fluid must be exhausted from the cylinders on the first side and supplied to the opposite cylinders.

In order to reduce the power consumption requirements of active suspension systems, there is a trend towards combining conventional support springing with active roll control systems, such as coil springs with active, powered anti-roll bar adjustment systems. Although these systems reduce the power requirements of the suspension system, they still need to have pumps, supply accumulators, reservoirs, supply plumbing and a control system. The pumps still draw power to provide pressurised fluid to the control system and can generate noise, as can the valves in the control system. Systems such as these demand detailed design and development to reach the levels of refinement required by vehicle manufacturers, yet their off road performance is still not entirely satisfactory as the support springs compress in cross-axle articulation, generating uneven wheel loadings and limiting performance.

There is disclosed in International Application Number PCT/AU96/00528 a roll stabilisation system linked front to rear to passively resist roll motions of the vehicle, without introducing substantial cross-axle articulation stiffness. In the above noted patent application there is disclosed a number of arrangements, some of which are improved roll stabilisation systems which can be applied to conventionally suspended vehicles, others include improved support means to suspend the vehicle body thereby conveying all the desirable characteristics discussed above. A potential limitation of the systems disclosed in the above patent application is that the packaging requirements of the combined freely cross-axle articulating roll stabilisation and support systems may not always be compatible with many typical modern, space-efficient vehicle designs.

Other mechanical systems with the same objections of resilient support, roll control and free cross-axle articulation are disclosed in International Application Number PCT/AU95/00135 and in U.S. Pat. No. 2,099,819.

SUMMARY OF THE INVENTION

It would therefore be advantageous to provide an improved passive suspension system combining a freely cross-axle articulating roll stabilisation system with a separate support system. The individual systems may then be located quite separately, giving the designer more freedom and a greater range of possible package envelopes to choose from while maintaining all of the desirable characteristics discussed above. Furthermore, the separate roll stabilisation and support systems may be designed to package into similar areas to existing conventional anti-roll bars and coil springs or torsion bars for example, allowing the improved suspension system to be packaged into modern vehicle designs with little alteration necessary. Such systems can however also have applications on other forms of land and sea transport where the packaging requirements are not as limiting, such as agricultural tractors. For ease of reference, throughout the specification, the term chassis will be used for the vehicle body. It should be noted that the "chassis" may, for example, be a monocoque or spaceframe structure.

With this in mind, the present invention provides in one aspect a suspension system for a vehicle having a chassis supported on at least one forward pair of laterally spaced wheels and at least one rear pair of laterally spaced wheels, including vehicle support means for supporting the chassis above each said pair of wheels, and roll moment reaction means for providing location of the chassis about a substantially level roll attitude, said roll moment reaction means including a respective roll attitude control mechanism for each pair of at least two said pairs of laterally spaced wheels for passively controlling the position of the wheels relative to each other and the chassis, each roll attitude control mechanism being connected to at least one other roll attitude control mechanism by roll mechanism interconnection means, said roll mechanism interconnection means being arranged such that the roll moment reaction means resists roll of the vehicle chassis with respect to the wheels, whilst simultaneously permitting cross-axle articulation motions of the wheels, wherein the vehicle support means for at least one pair of wheels includes at least a first support means for supporting at least a portion of the load on said vehicle support means, said first support means providing substantially zero roll stiffness for the vehicle, the roll moment reaction means being separate from the vehicle support means thereby providing substantially zero load carrying capacity.

The roll moment reaction means do not afford any form of load carrying capability, and are provided to locate the vehicle body about its roll axis whilst introducing substantially zero cross-axle articulation stiffness. An advantage of this suspension system is that the support means and the roll moment reaction means are effectively physically and functionally independent. This allows alternative vehicle support means to be readily interchanged and used in conjunction with separately located alternative roll moment reaction means, giving a wide range of available combinations and packaging alternatives.

It should be noted that the term "wheel" can also refer to other forms of surface engaging means such as skis, the term being used herein in this broad manner.

The vehicle support means for at least one pair of laterally spaced wheels may provide substantially zero roll stiffness.

Alternatively, the vehicle support means for each said pair of wheels may provide substantially zero roll stiffness, thereby providing substantially equal wheel loading for non-dynamic wheel displacements, regardless of the cross-axle articulation, up to the limit of travel of at least one of the vehicle support means or the roll moment reaction means.

It is also possible for the vehicle support means for at least one pair of wheels further include additional independent second support means, the second support means including resilience and being arranged to provide a degree of support and a degree of roll stiffness for the vehicle.

Each roll attitude control mechanism may include at least one transverse torsion bar and an adjustment means to enable the position of one of the associated wheels to be adjusted with respect to the position of the other wheel in an opposing direction thereof, the adjustment means of one said roll attitude control mechanism being interconnected with the adjustment means of another said roll attitude control mechanism by the roll mechanism interconnection means such that the relative positions of said one pair of laterally spaced wheels are adjustable in an opposing direction to the relative positions of the other said pair of laterally spaced wheels.

Although the roll motions are resisted and the articulation motions are permitted by the roll moment reaction means, said means can passively differentiate between these two modes and continually maintain both properties, even providing both modes simultaneously as required.

The support means may be resilient and still provide substantially zero roll stiffness.

According to another aspect of the present invention, there is provided a suspension system for a vehicle having a chassis supported on at least one forward pair of laterally spaced wheels and at least one rear pair of laterally spaced wheels, including vehicle support means for supporting the chassis above each said pair of wheels, the vehicle support means for at least one pair of wheels including at least a first support means to support at least a portion of the load on the vehicle support means said first support means providing substantially zero roll stiffness for the vehicle, and roll moment reaction means separate from the vehicle support means for providing location of the chassis about a substantially level roll attitude to thereby resist roll of the chassis with respect to the wheels while simultaneously permitting cross-axle articulation motions of the wheels, said roll moment reaction means providing substantially zero load carrying capacity for the vehicle, wherein the roll moment reaction means includes a roll attitude control mechanism for each pair of at least two pairs of laterally spaced wheels, said roll attitude control mechanism including at least one transverse torsion bar and an adjustment means to enable the position of one of the associated wheels to be adjusted with respect to the position of the other wheel in an opposing direction thereof, the adjustment means of one said roll attitude control mechanism being interconnected with the adjustment means of another said roll attitude control mechanism by a roll mechanism connection means, such that the relative positions of said one pair of laterally spaced wheels are adjustable in an opposing direction to the relative positions of the other said pair of laterally spaced wheels.

The first support means may include a load support device for each wheel, the load support devices for a laterally spaced pair of wheels being interconnected by a support interconnection means such that as one of said wheels is displaced upwards with respect to the chassis, the other wheel is urged downwards. The support interconnection means may provide a degree of resilience such that the first support means provides resilient support of the vehicle chassis while introducing substantially zero roll stiffness. Alternatively, at least one of the load support devices may provide a degree of resilience such that the first support means provides resilient support of the vehicle chassis The load support devices may be in the form of extensible and retractable fluid containers, the support interconnection means being a conduit interconnecting the fluid containers to provide fluid communication therebetween. The support interconnection means may further include an accumulator means in fluid communication with the conduit interconnecting the fluid containers, for providing at least part of the resilience of the first support means, and flow control means between the conduit and the accumulator means for controlling fluid flow therebetween. Alternatively, the support interconnection means may further include at least one flow control means on the conduit for controlling fluid flow therethrough, and the flow control means may include an accumulator means for providing at least part of the resilience of the interconnected first support means.

The suspension system as described above may further include for at least one said pair of laterally spaced wheels having interconnected first support means, additional independent second support means for each wheel, the second support means including resilience, to thereby provide a roll stiffness for the vehicle. The second support means may for example be in the form of a spring.

According to another preferred aspect of the suspension system according to the present invention, the chassis is supported above the respective wheels by the vehicle support means acting on respective suspension arms provided for each wheel, the vehicle support means for at least one said pair of laterally spaced wheels including a load support device respectively provided for each suspension arm for supporting at least a portion of the load on the respective vehicle support means, wherein at least one of the load support devices includes a torsion bar rotatably located at one end by the associated suspension arm, the other end having a support lever arm rigidly connected thereto, a support interconnection means pivotally connected at one end to the support lever arm of the load support device for one wheel of the laterally spaced pair, the other end of the support interconnection means being pivotally connected to a support lever arm included in the load support device of the other laterally spaced wheel.

Each of the load support devices may include a substantially longitudinally aligned support torsion bar driven at one end by the associated suspension arm, the other end having a support lever arm rigidly connected thereto, the support interconnection means being a link having its ends pivotally connected to said support lever arms of the load support device for each wheel of the laterally spaced pair.

Alternatively, the torsion bar may be rotatably located to the associated suspension arm by a bounce tube, said bounce tube being connected to and extending from said associated suspension arm at one end, the other end of the bounce tube being rigidly connected to the torsion bar, said torsion bar being located inside the bounce tube and protruding out of the end by the suspension arm, the protruding end of the torsion bar having the support lever arm rigidly connected thereto.

Alternatively, the link forming the support interconnection means may include support adjustment means for varying the length of said link to thereby vary the height of the vehicle. The support adjustment means may include an hydraulic cylinder. The support adjustment means may further include an accumulator in fluid communication with the hydraulic cylinder, and may include a flow control means for controlling the fluid communication between the hydraulic cylinder and the accumulator.

According to a further preferred arrangement, an additional force resolving link may be pivotally connected to the support lever arm of each load support device, such that the force resolving link acts parallel to the support interconnection means thereby substantially resolving the lateral loads in the support interconnection means within the vehicle support means.

In the suspension systems described above, each adjustment means may include a double-acting hydraulic cylinder, the adjustment means being arranged such that the hydraulic cylinder is urged to extend and contract as one wheel of the associated laterally spaced pair moves in substantially the opposite direction to the other wheel relative to the chassis, and the roll mechanism interconnection means between the adjustment means of at least two roll attitude control mechanisms being two fluid conduits interconnecting the double-acting hydraulic cylinders such that roll motions tend to generate pressure in one of the fluid conduits thereby transmitting the roll forces into the transverse torsion bars to react at least a portion of the roll moment on the chassis, and articulation motions cause one cylinder to extend and the other to contract, generating a fluid flow between the cylinders.

At least one of the fluid communicating conduits interconnecting the hydraulic cylinders may further include flow control means for controlling the fluid flow through said conduit. Alternatively, the hydraulic cylinder of at least one of the adjustment means is located between the end of the transverse torsion bar and the wheel such that as one wheel moves in the opposite direction to the other, the cylinder is urged to extend and contract. Furthermore, the transverse torsion bar may alternatively be interconnected at one end thereof to one wheel, the other end of the torsion bar being connected to the adjustment means which in turn is interconnected to the other wheel, the adjustment means including a cradle which is rotatably connected to the end of the torsion bar and interconnected to the wheel, the hydraulic cylinder being connected between the cradle and a lever arm formed on the end of the torsion bar, such that as the cylinder extends and retracts, one wheel is urged to move in substantially the opposite direction to the other wheel with respect to the chassis.

It is also preferred that the roll attitude control mechanism includes two aligned transverse torsion bars, one for each wheel, having lever arms at their inner ends, the bars being interconnected by the adjustment means including the hydraulic cylinder pivotally connected to one said torsion bar lever arm, a cradle pivotally connected to the other said torsion bar lever arm and to the hydraulic cylinder, and a locating link for locating the cradle relative to the chassis. The locating link may be of variable length for controlling the position of the cradle relative to the chassis.

According to a further preferred arrangement, the roll attitude control mechanism for each pair of wheels may include two aligned transverse torsion bars interconnected by the adjustment means, one associated with each wheel, the adjustment means being in the form of a mechanical linkage arrangement for linking the two torsion bars to one end of a roll attitude bar, the other end of the roll attitude bar being connected to the mechanical linkage arrangement of the other roll attitude control mechanism, such that rotation of the aligned transverse torsion bars in a common direction results in axial displacement of the roll attitude bar, and rotation of the aligned torsion bars in opposing directions results in an axial rotation of the roll attitude bar. The roll attitude bar may include a splined connection to allow the length of the roll attitude bar to vary such that pitch motions of the vehicle are passively permitted. The roll attitude bar may further include resilient and pitch damping means for providing a degree of pitch coupling control.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

It will be convenient to further describe the invention by reference to the accompanying drawings which illustrates preferred embodiments of the present invention. Other embodiments of the invention are possible, and consequently the particularity of the accompanying drawings is not to be understood as superseding the generality of the preceding description of the invention.

In the drawings.

DETAILED DESCRIPTION OF THE PREFERRED EMBODIMENTS

Figure 1:
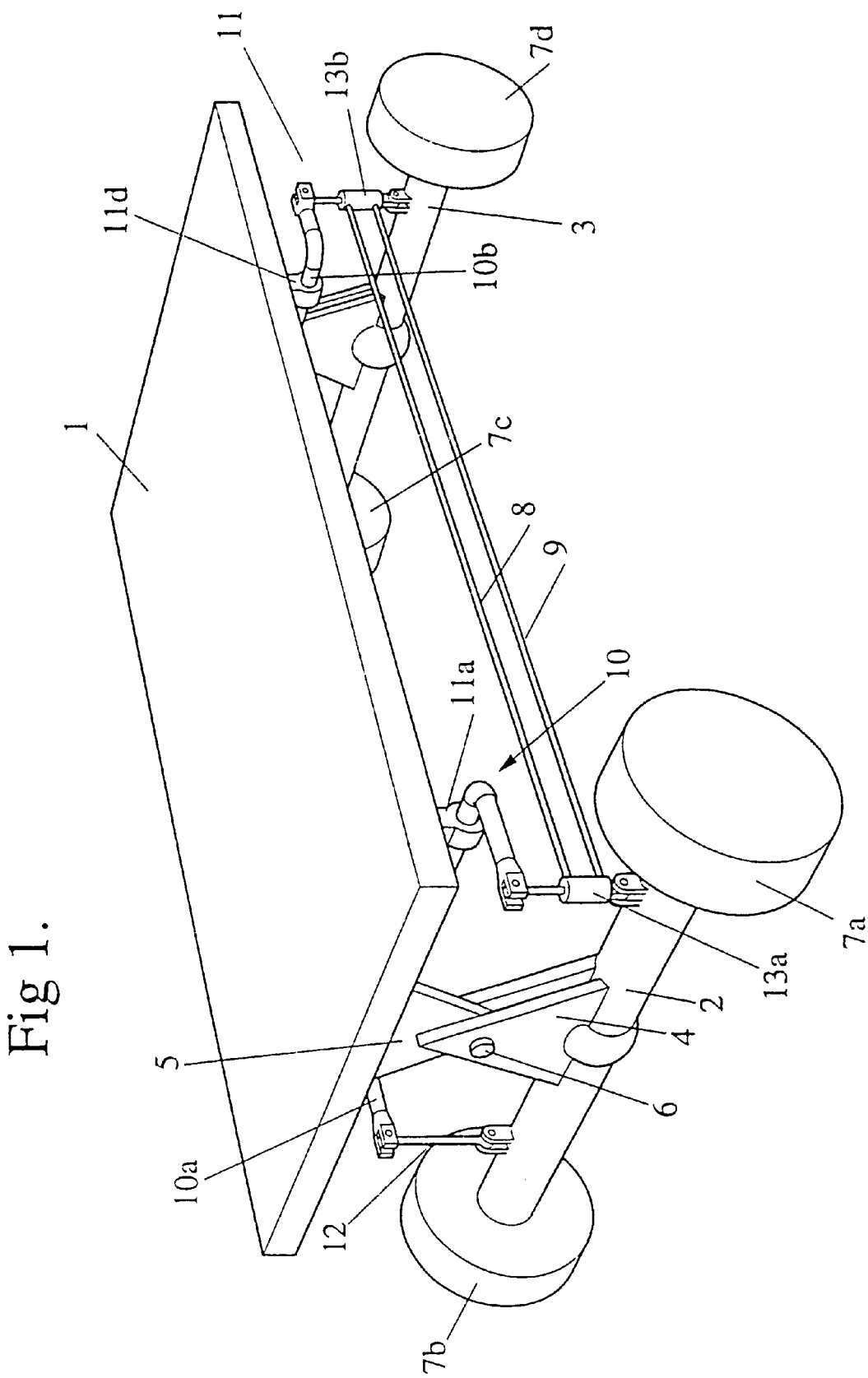
FIG. 1 shows a first embodiment of the suspension system according to the present invention.

Referring initially to FIG. 1 there is illustrated a vehicle body or chassis 1 pivotally supported above front and rear axles 2 and 3 respectively such that there is no vertical resilience and no roll stiffness provided by the vehicle support. The front axle bracket 4 is connected to the chassis front bracket 5 by a pin-type joint 6 which has its axis of rotation along the length of the vehicle. A similar arrangement is provided at the rear of the chassis to vertically support the chassis 1 above the wheels 7a, 7b, 7c, 7d without producing any roll or articulation stiffness.

In order to locate the rotational position of the chassis about the roll axis, a roll moment reaction system is provided. This comprises front and rear axle roll attitude control mechanisms, interconnected front to rear by upper and lower conduits 8 and 9 respectively, to permit substantially free cross-axle articulation and resist roll motions.

The front axle roll attitude control mechanism includes a lateral torsion bar 10a which has integral level arms forming a U-shape, similar to a conventional anti-roll bar. The lateral torsion bar 10a is rotatably joined to the chassis by bushes 11a and 11b aligned along the major axis of the bar. A drop link 12 is connected at its upper end to the end of one of the torsion bar lever arms. The lower end of the drop link 12 is connected to the front axle 2 by a rod end, although conventional rubber bushes could be used. The end of the other torsion bar lever arm is connected to said axle by an hydraulic cylinder 13a. Therefore, for the front axle 2 to rotate relative to the chassis 1 and about the pin-type joint 6, the cylinder 13a must extend or contract and/or the lateral torsion bar 10a must become twisted due to the torsional loading exerted by the lever arms.

By providing a similar roll attitude control mechanism for the rear axle and interconnecting the front and rear hydraulic cylinders 13a and 14b respectively by the conduits 8 and 9, the roll moment reaction system is formed which passively differentiates between the roll and articulation modes of axle motions. The upper chambers of the hydraulic cylinders are in fluid communication by the upper fluid conduit 8 and the lower chambers of said cylinders are in fluid communication by the lower fluid conduit 9. If the hydraulic cylinders are positioned adjacent to diagonally opposite wheels, the connection sequence must be changed and the cylinder design modified to make the lower chamber effective piston area equal to that of the upper chamber.

As a load is added to the left hand side of the chassis 1, or as the vehicle turns to the right the chassis will attempt to rotate about the pin-type joints 6 such that the left hand side moves downwards towards the left hand wheels 7a and 7d. This will attempt to compress the hydraulic cylinders 13a and 13b. Since the cylinders are filled with incompressible hydraulic fluid and interconnected front to rear, as the above roll moment is applied to the chassis, the pressure in the lower chambers and the lower fluid conduit 9 will increase, preventing any cylinder compression. Cylinder motion is possible in roll if the ratio of cylinder sizes front to rear does not match the ratio of front to rear anti-roll bar stiffnesses. This may be done to control the roll moment distribution of the vehicle. With the roll moment being applied to the chassis producing a change of force in the cylinders 13a and 13b, a roll couple is produced by the lateral torsion bar on the chassis, with the drop link 12 being in tension. If the roll moment was produced by an eccentric load being added to the chassis, the full magnitude of that load is reacted by the vehicle supports through the pin type joints 6 with the roll moment produced by the eccentricity being reacted by a couple produced by the roll moment reaction system acting through the bushes 11a, 11b, 11c and 11d.

The roll stiffness can be altered by changing the resilience of the lateral torsion bars 10a and 10b. Unlike conventional suspension anti-roll bars, changing the bar stiffnesses does not change the roll moment distribution of the roll moment reaction system, only the total roll stiffness provided. The roll moment distribution is determined by the relationship between the front to rear cylinder effective piston areas and the amount of mechanical advantage of the front cylinder to the front wheels compared to the rear mechanical advantage.

In a cross-axle articulation motion, such as for example the front left and back right wheels , 7a and 7c respectively, moving upwards toward the chassis 1 and the front right and back left wheels, 7b and 7d respectively, moving downwards away from the chassis. In this motion, fluid is expelled from the top chamber of the front cylinder 13a, along the top fluid conduit 8 into the top chamber of the rear cylinder 13b. Similarly fluid is transferred from the lower chamber of the rear cylinder 13b to the lower cylinder of the front cylinder 13a, along the lower conduit 9. In this way, the front cylinder can extend and the rear cylinder can contract, without substantial changes in the upper and lower pressures and therefore without significantly changing the torsional loading on the lateral torsion bars 10a and 10b, leaving the axles free to articulate.

Figure 2:
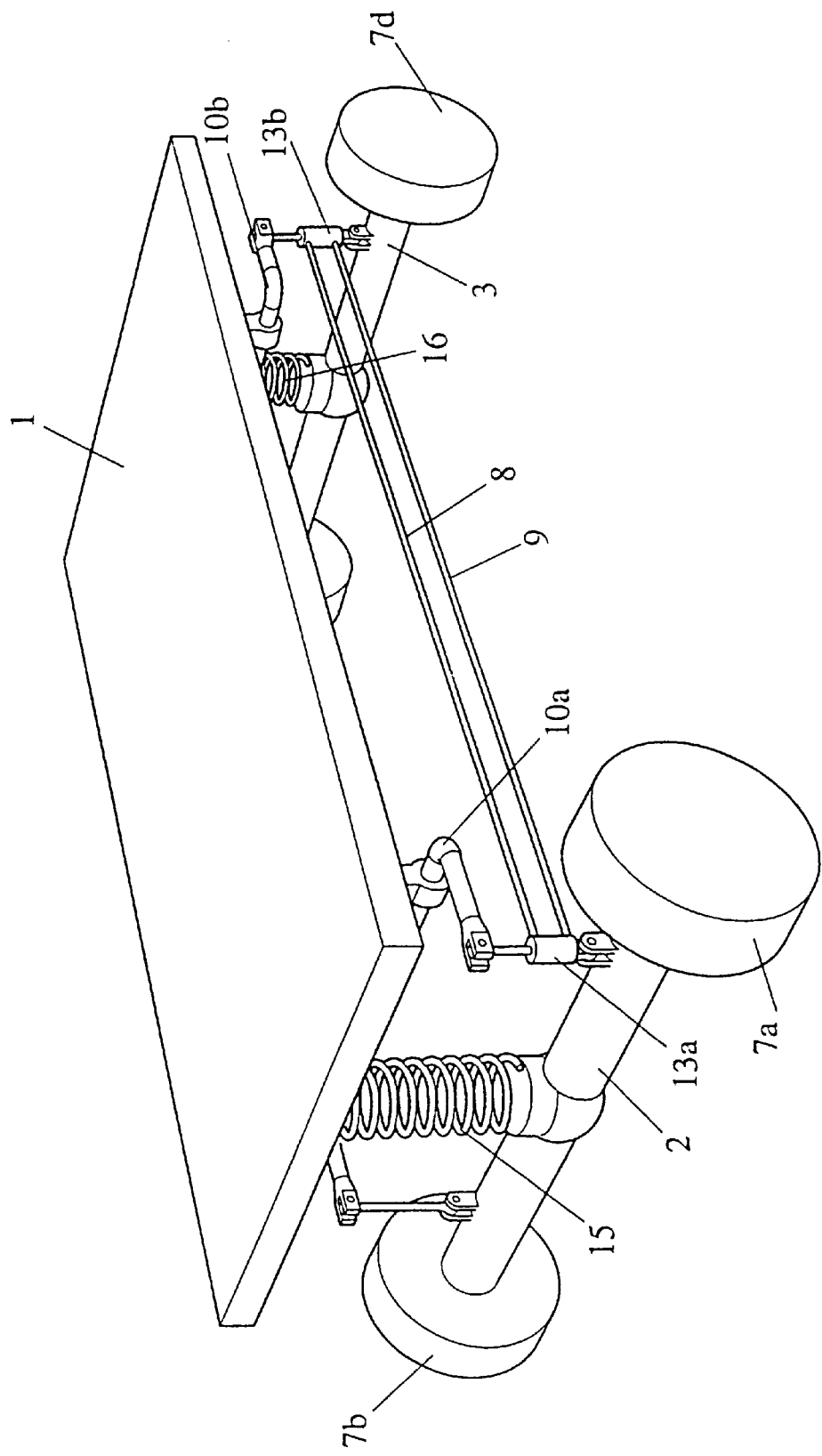
FIG. 2 illustrates an improvement to the system shown in FIG. 1, providing vertical resilience in the suspension.

Fully resilient suspension can be gained by simply replacing the front and rear pivotal supports with a single spring at each end as shown in FIG. 2. The front and rear springs 15 and 16 respectively may be of any known fluid or mechanical type, coil springs being shown for clarity. The axle may need additional locating links (not shown), since the mounting of the spring should not produce any significant roll stiffness, but needs to locate the chassis (1) transversely and longitudinally with respect to the axles (2 and 3). It should be understood that it is not necessary to replace both the front and rear uncompliant supports with resilient supports. It may be advantageous in some applications to keep one end of the chassis uncompliant and the other end resilient.

Figure 3:
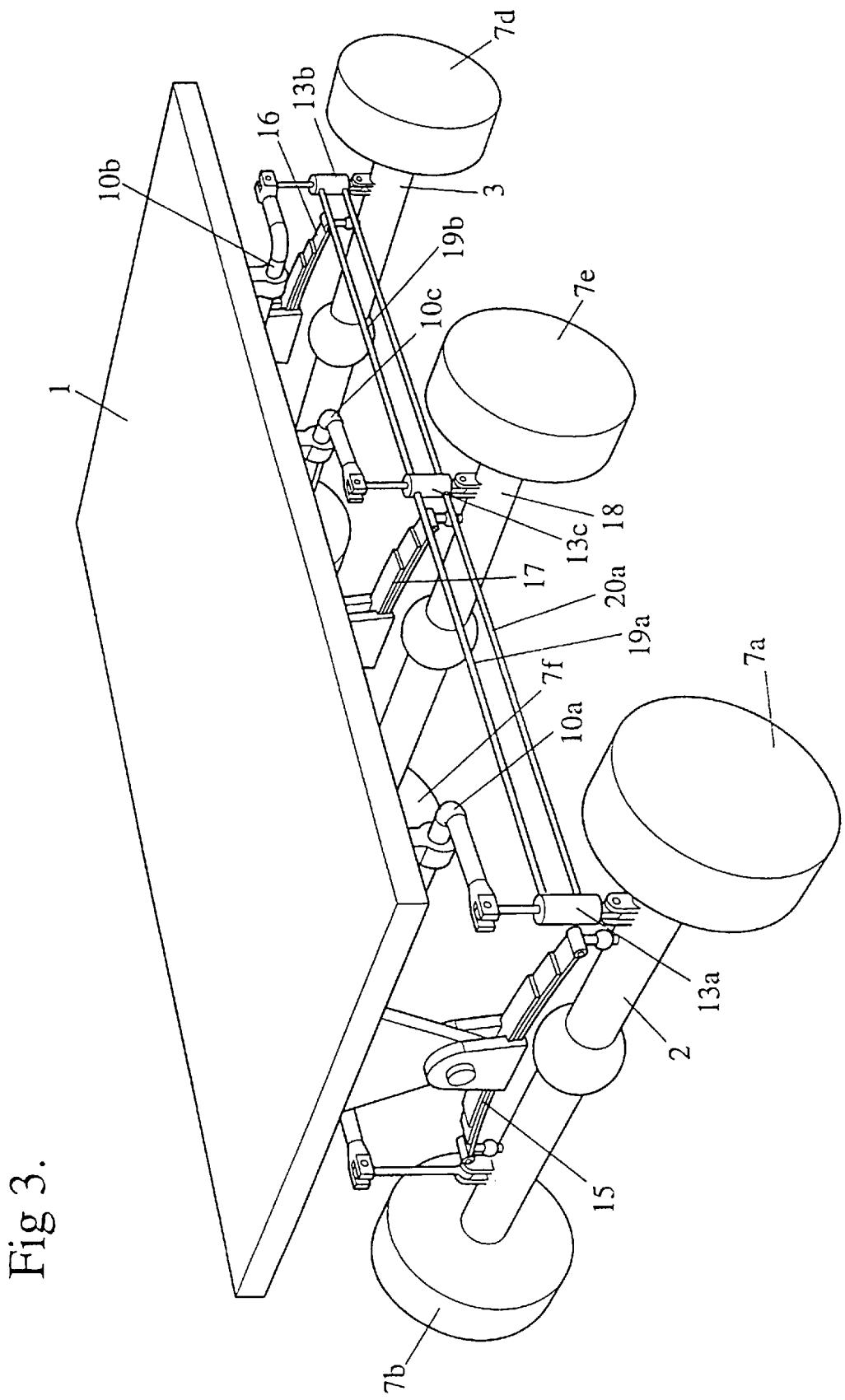
FIG. 3 shows the present invention applied to a six-wheeled vehicle and illustrates an alternative resilient support arrangement.

FIG. 3 illustrates a six-wheeled embodiment of the invention by adding a third axle 18, having wheels 7c and 7f, between the front and rear axles 2 and 3. The support 17 shown for this and the other axles is another form of resilient support with substantially zero roll or articulation stiffness, a transverse leaf spring pivotally mounted to the chassis 1. The leaf spring may be pivotally connected to the axle in the centre if required, but is not usually desirable to heavily load the axle in the centre. The spring can be inverted such that the ends are higher than the centre section to improve packaging under a vehicle engine sump for example. The roll moment reaction system can be simply adapted to include a central axle rotational positioning device similar to those at the front and rear, including a lateral torsion bar 10c connected to the axle 18 by a drop link at one end and an hydraulic cylinder 13c at the other. The upper chamber of the hydraulic cylinder 13c is in fluid communication with the upper chambers of the front and rear cylinders 13a and 13b by upper fluid conduits 19a and 19b. Similarly the lower chamber of the centre cylinder 13c is in fluid communication with the lower chambers of the front and rear cylinders by the lower fluid conduits 20a and 20b.

An alternative arrangement of the roll moment reaction for a six-wheeled vehicle is to provide two hydraulic cylinders on the centre axle, one connected by conduits 19a and 20a to the front cylinder 13a, the other connected by conduits 19b and 20b to the rear cylinder 13b.

Although the invention has been illustrated on beam axle vehicles so far, it can equally be applied to independently suspended vehicles.

Figure 4:
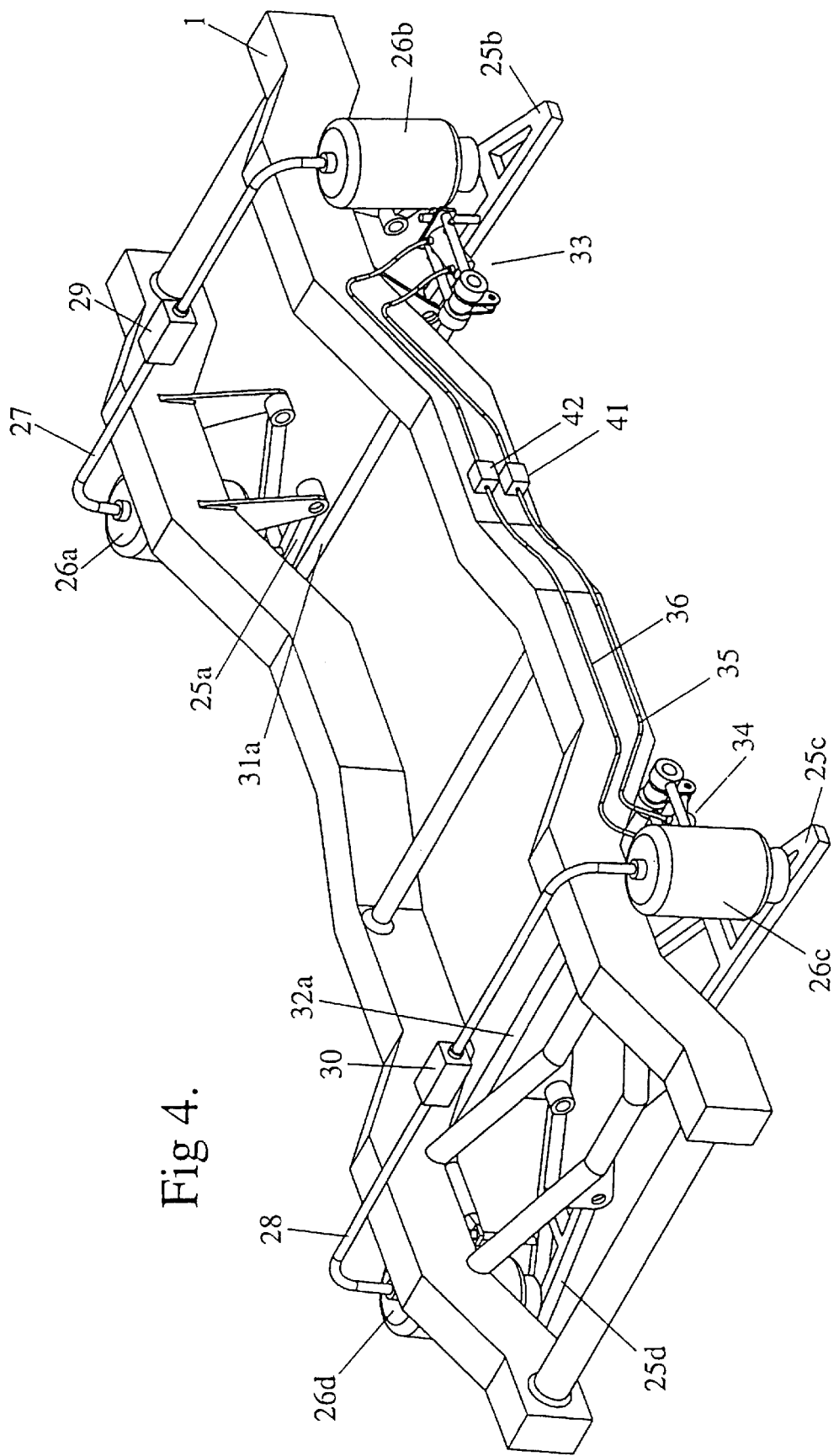
FIG. 4 shows a fourth, more detailed embodiment of the suspension system according to the present invention.

Referring now to FIG. 4 there is shown a chassis 1 which is supported above the ground on four wheels (not shown). Suspension arms locate each wheel to the chassis, the respective suspension arms (25a, 25b, 25c, 25d) being associated with the front left, front right, back right and back left wheels respectively. Vehicle support is provided by conventional air bags (26a, 26b, 26c, 26d), the air bags for the front wheels being connected together by a pipe 27, and the rear air bags being interconnected by a similar pipe 28. By connecting the air bags laterally across the vehicle through pipes 27 and 28, each end of the vehicle is supported at an average height although the wheels are free to move in roll and cross-axle articulation motions. The upper wishbones and the dampers have been omitted for clarity.

Once again, to prevent the vehicle body from adopting an uncontrolled list, a roll moment reaction system is required. The roll moment reaction system shown in FIG. 4 is very similar to that shown in the earlier Figures and is just one of a number of possible arrangements which all have the required combination of providing roll stiffness and allowing free cross-axle articulation with substantially no change in the loading on each wheel in lower speed articulation motions. These properties are achievable with a sealed, passive roll moment reaction system. These systems differ from many prior art systems in that the vehicle roll stiffness is substantially unaffected when the wheels are in large displacement cross-axle articulation positions, ensuring that the vehicle is stable in all situations when the wheels are on the ground. This property is essential when the vehicle support springs are laterally interconnected and providing negligible roll stiffness. Statically the loading on each wheel should not change substantially with even large displacement articulation motions of the wheels relative to the vehicle body. Dynamically, the inertia of the vehicle body prevents it from always being in a position such that the wheel loadings remain substantially constant as speeds increase.

Referring again to FIG. 4, a preferred embodiment of the sealed, passive roll moment reaction system is illustrated. It includes a front roll attitude control mechanism including a lateral torsion bar 31a disposed between the front pair of wheels and connected to the associated suspension arms 25a and 25b and a rear roll attitude control mechanism including a lateral torsion bar 32a disposed between the rear pair of wheels and connected to the associated suspension arms 25c and 25d. At one end of each lateral torsion bar is a roll attitude adjustment device, denoted by reference numerals 33 at the front and 34 at the rear, which are interconnected front to rear by conduits 35 and 36 such that roll motions are resisted and cross-axle articulation motions are permitted by the roll attitude control mechanisms.

Figure 5:
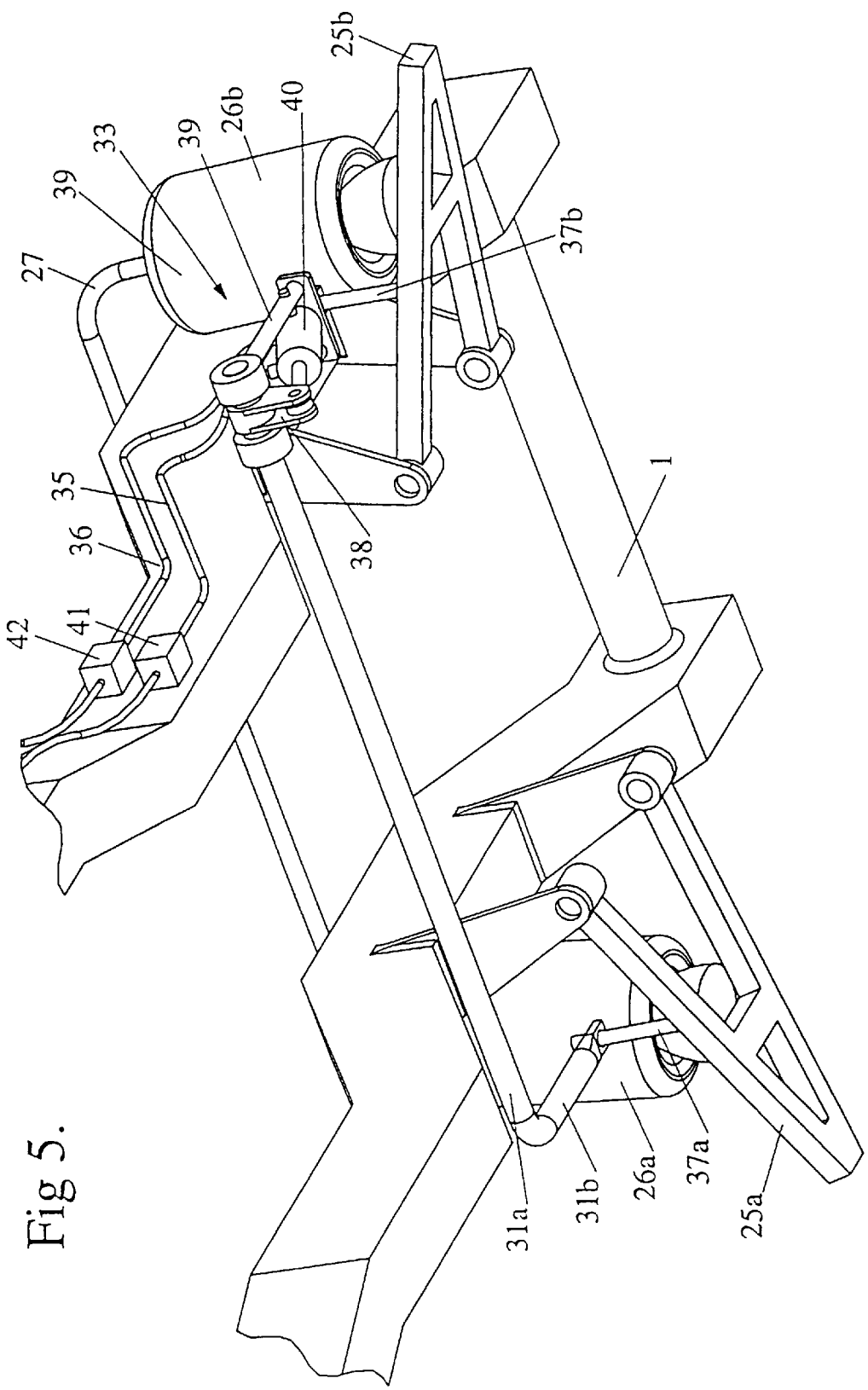
FIG. 5 is an enlarged view of one end of a chassis fitted with the fourth embodiment of the suspension system.

The arrangement of the front roll moment reaction system is shown in more detail in FIG. 5. The front lateral torsion bar 31a has at its left end a bend forming a lever arm portion 31b which is used to input forces from the front left suspension arm 25a via a drop link 37a of known design. The opposite end has a roll attitude adjustment device 33 extending forwards in a similar manner to the lever arm portion 31b of the torsion bar on the left hand side and is connected to the front right suspension arm 25b by a similar drop link 37b. The roll attitude adjustment device comprises a lever arm 38, rigidly fixed to the torsion bar 31a, a cradle 39 rotatably fixed to the torsion bar 31a and pivotally supporting one end of a double acting hydraulic cylinder 40, the other end of said cylinder is pivotally connected to the lever arm 38.

In this arrangement, as shown in FIGS. 4 and 5, any extension or contraction of the double acting cylinder 40 results in a substantially vertical motion of one front wheel relative to the other. In order to gain intelligent passive control of the front roll attitude adjusting mechanism, a similar roll attitude control mechanism must be provided between the rear wheels of the vehicle, as shown in FIG. 4. By connecting the chambers of the front double acting hydraulic cylinder with the corresponding chambers of the rear double acting hydraulic cylinder by conduits 35 and 36, a system is formed which can passively differentiate between roll and cross-axle articulation motions of the front and rear wheels and simultaneously combine high roll stiffness with negligible cross-axle articulation stiffness.

The operation of the roll moment reaction system will now be described with reference to FIG. 4. As the vehicle rolls to the right for example for a left hand turn, the suspension arms 25b and 25c on the right hand side of the vehicle are pushed upwards generating pressure in the minor chambers of the front and rear hydraulic cylinders. Since these chambers are interconnected by the fluid conduit 35, as the vehicle attempts to roll, the pressure increases in both minor chambers and along the conduit, providing a restoring moment to the vehicle body via the roll bar. When the vehicle is traversing uneven terrain, the suspension system is required to undergo cross-axle articulation motions. For example the front right wheel may need to move upwards towards the vehicle body and the front left wheel downwards. To permit this, the front hydraulic cylinder must extend. Simultaneously the back right wheel moves downwards and the back left wheel moves upwards, requiring that the rear hydraulic cylinder contract. For this cross-axle articulation motion to occur, fluid is transferred from front to rear along conduit 35 and from rear to front along conduit 36. The energy for this fluid transfer is generated by the motion of the wheels relative to the body and is input directly from wheel to roll attitude control mechanism by the suspension arm and drop link. No additional power is required and little pressure is generated. Significant pressure is only generated in articulation if the roll moment reaction system is working against the vehicle support springs or if the wheels at one end of the vehicle have reached the ends of their strokes.

Additionally, if a bump is encountered whilst cornering for example, the single wheel stiffness is not determined by a single roll stabilising torsion bar, but by a combination of the front and rear roll stabilising torsion bars in series, with both double acting hydraulic cylinders moving. This reduces the disturbance to the vehicle body for a vehicle with this passive interconnected form of roll control from the level of disturbance felt in a vehicle fitted with conventional independent roll stabilisation bars and a similar roll stiffness. Similarly, due to body inertia, in a high-speed single wheel bump, the single wheel stiffness due to the support means is reduced over a conventional suspension system. Despite the fact that the body does not move instantly to the average of the ground plane, the loads due to the compression of the support springs are shared between the associated wheels. For example, if the front right wheel is accelerated upwards with respect to the body, the vertical displacement of the front right wheel is resiliently absorbed by springs of both the left and right wheels (in this case the air bags 26a and 26b) by means of the interconnection (the pipe 27). This transforms the reaction of the vehicle support springs from a single wheel input at the full two-wheel bounce stiffness to a two wheel input at half the two-wheel bounce stiffness, thereby reducing harshness and roll accelerations (commonly known as "head toss" or "roll rock").

Further improvements to the present invention will now be described firstly with reference to FIG. 4.

The free flowing front and rear air bag interconnecting pipes 27 and 28 may optionally include variable restriction or lockout valves 29 and 30 which can be controlled by common or individual wheel pair inversely proportional motion controllers. For example, to increase the roll stiffness of the suspension system in a simple sports or on-road mode, the valves 29 and 30 may be closed by a driver operated switch. To regain the free cross-axle articulation required off-road the lockout can be deactivated restoring free flow along pipe 27 between the front pair of air bags and along pipe 28 between the rear pair of air bags. Alternatively the valves may be individually variable controlled to influence the front and rear roll rates in response to the sensed yaw rate. For example, the valves may be normally open in straight line running of the vehicle and as soon as a first lateral acceleration or yaw set-point is reached, the front and rear valves are rapidly closed. The set-point can be determined by a number of known methods taking any combination of known inputs such as speed and steering wheel angles and the comparing to the actual lateral acceleration and/or yaw rate. The inputs during the turning manoeuvre may be monitored and compared to a second lateral acceleration or yaw set-point (which includes a deadband), with the front or rear valve being opened to change the rate of yaw dependent on whether the actual rate of yaw is greater or less than the calculated rate (or more realistically a range of acceptable values) given the other inputs. This can be used to modify the handling balance by changing the roll moment distribution which makes the vehicle understeer or oversteer.

Figure 6:
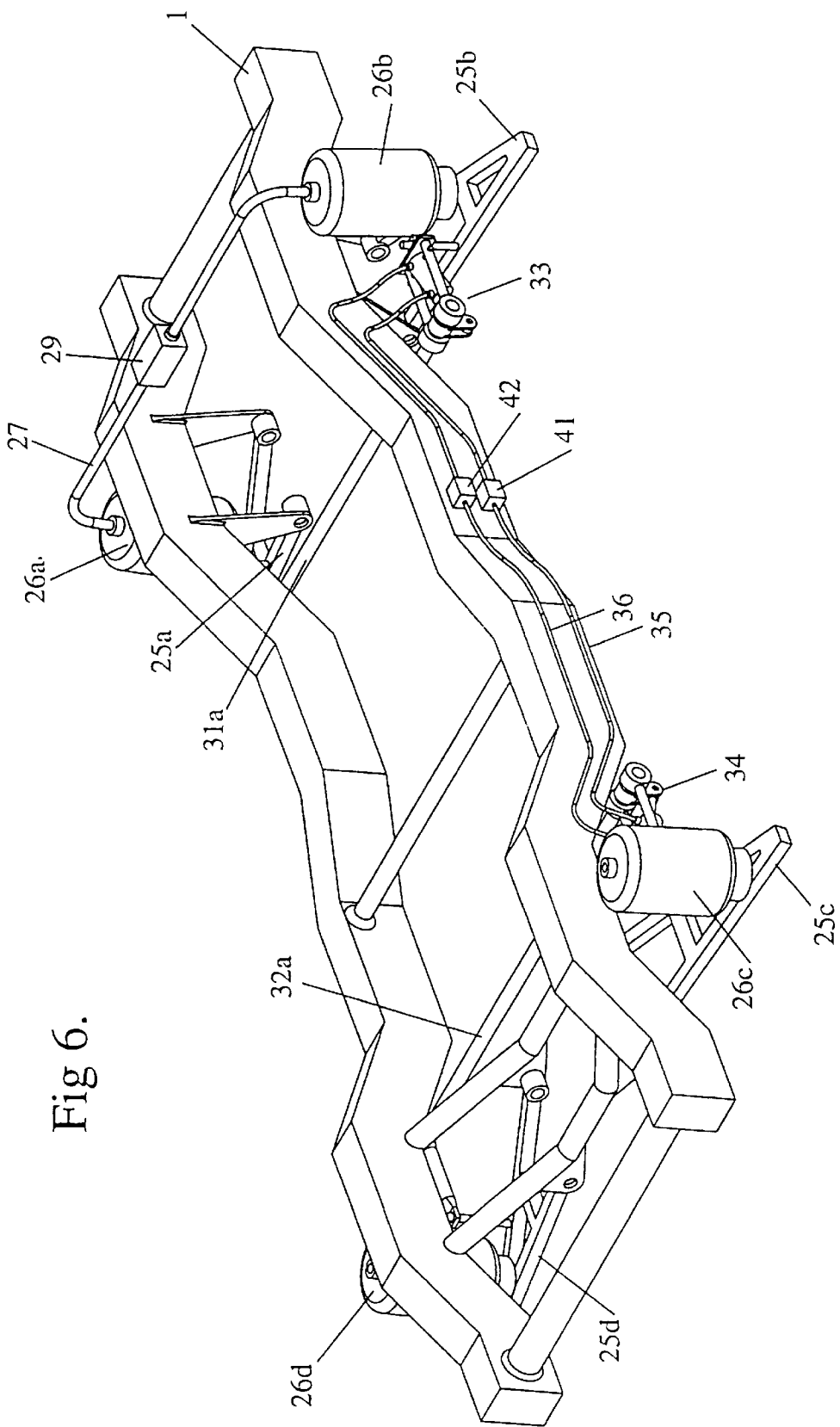
FIG. 6 illustrates a modification of the suspension system of FIG. 5.

Optionally, one of the air bag interconnecting pipes 27 or 28 may be removed as shown in FIG. 6. This is especially desirable when the vehicle support means include some form of height control such as "load levelling", since the one load levelling system can also then be used to provide a fine degree of roll attitude levelling. The disadvantage of not interconnecting all the support means is that they do not act inversely proportionally so give rise to uneven wheel loadings in articulation motions.

Variable restriction or lockout valves 41 and 42 may be provided in conduits 35 and 36 interconnecting the front and rear roll attitude adjusting cylinders. These can for example be used to prevent lifting of a single wheel under extreme cornering combined with severe braking or acceleration. By using speed, throttle, brake and wheel position signals and/or lateral and longitudinal acceleration inputs, the imminent or actual lifting of a wheel can be detected and the valves 41 and 42 closed to reduce or prevent the lifting of the wheel. When systems of this type are used, the front and rear torsion bars must be sized such that their relative stiffnesses produce a safe roll moment distribution, ensuring a controllable handling balance. The roll moment distribution can be set so that the vehicle handling balance changes beneficially when the valves 41 and 42 are actuated. For example, with the valves set to block the conduits 35 and 36, the individual stiffnesses of the front and rear torsion bars can be designed to give the car a slightly understeering handling balance. When the valves 41 and 42 are open and the front and rear roll attitude adjustment cylinders can communicate freely, the ratio of the front to rear cylinder effective mechanical advantage can be sized to give the vehicle a neutral handling balance. This combination can be used to ensure that wheel lift is prevented.

It should be understood that any form of freely articulating vehicle support system may be combined with any form of separate freely articulating roll moment reaction means which provides a degree of location of the body about the level roll attitude.

Also, for the reasons described for the suspension system shown in FIG. 6, it may be advantageous to combine a roll moment reaction means having a low cross-axle articulation stiffness with a combination of a pair of inversely proportional supports at one end of the vehicle and conventional independent supports at the opposite end of the vehicle. Indeed, the vehicle support means for one end of the vehicle may comprise two resilient support devices at each wheel station, with the support means at the opposite end being either inversely proportional, independent, or another combination of the two. For example, the vehicle support at one wheel station may be a combination of a conventional independent spring and an additional resilient device which is interconnected to the additional resilient device at the laterally adjacent wheel station to give low roll stiffness. Each additional resilient device may for example be an air bag and may be mounted either in series or preferably in parallel with the independent spring. Arrangements such as these as outlined above, and their equivalents., while not having even wheel loading in cross axle articulation still provide significant comfort benefits and improve traction off-road, and so are also considered to fall within the scope of the present invention. Once again, the independent and inversely proportional supports may be constructed by any known means, many of which are described herein.

Figure 7:
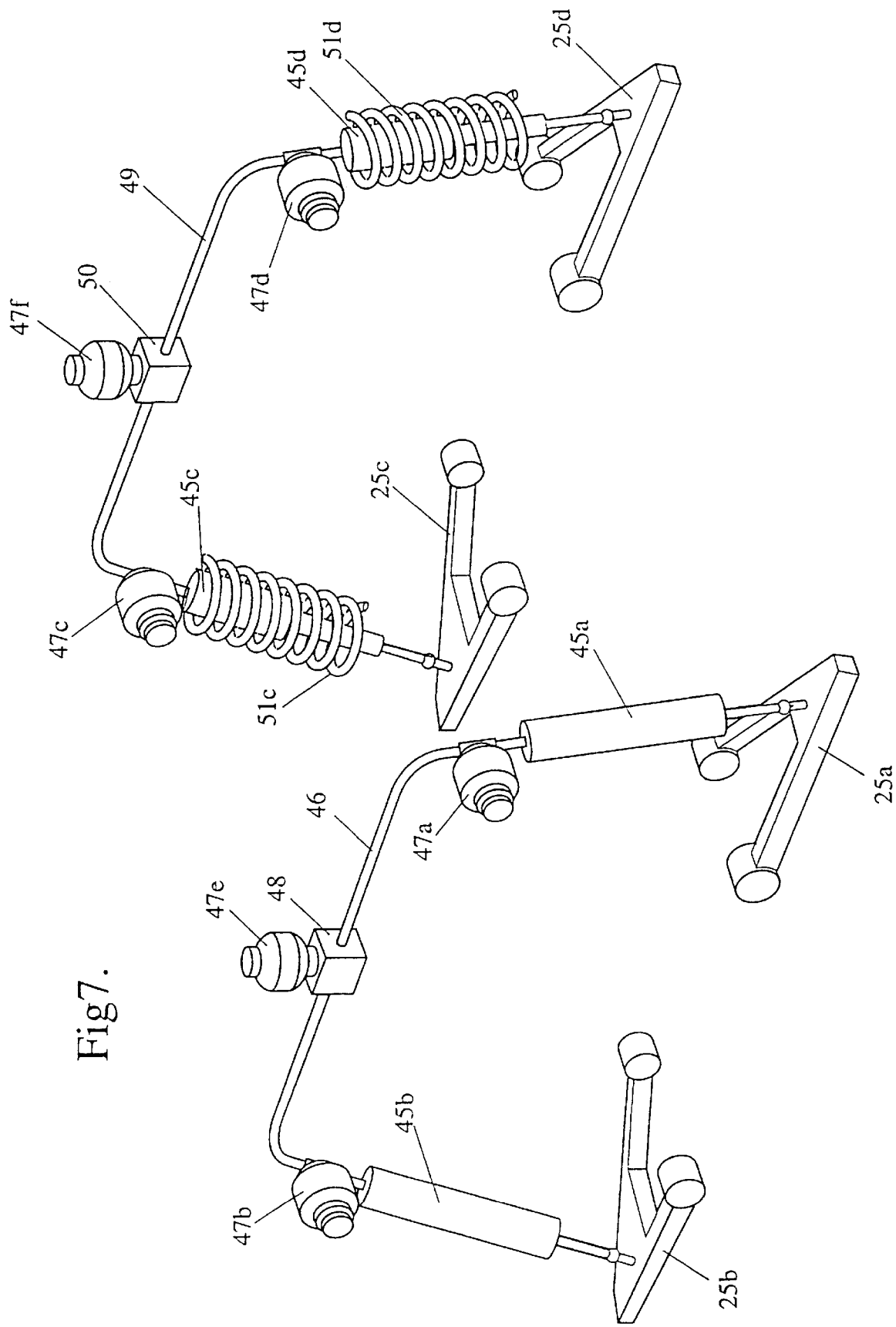
FIG. 7 shows alternative support arrangements, the one at the front being totally hydraulic, and that at the rear being a combined mechanical and hydraulic arrangement.

FIG. 7 shows an alternative inversely proportional support means at the front with the chassis and the front and rear roll attitude adjustment devices omitted for clarity. The rear support means comprise both conventional independent springs and an inversely proportional support means combined.

The front support means in this case are hydraulic cylinders 45a and 45b, which are connected to the respective front left and front right suspension arms (25a and 25b) at one end and to the chassis (not shown) at the other. The front hydraulic cylinders are interconnected by a pipe 46 to allow the supports to move freely in roll and cross-axle articulation motions. A hydropneumatic accumulator (47a and 47b) is located near each support cylinder to provide resilience in the support system. These accumulators may be connected directly to the cylinder body, or positioned along the interconnecting pipe 46. Lockouts or more preferably dampers, which may be multi-stage or variable restrictors, may be located between the accumulator and the pipe 46. Dampers may optionally or additionally be placed in the interconnecting pipe 46, between the accumulator and the cylinder and/or between the accumulator and the opposite side of the vehicle.

The pipe may include a variable restriction or lockout valve block 48, similar to that described in FIG. 4 for the air bag support system for controlling the flow of fluid between the cylinders (45*a* and 45*b*). A hydropneumatic accumulator 47*e* may be placed towards the centre of the interconnecting pipe. This accumulator may be used as the sole source of resilience for the front support means, replacing the accumulators 47*a* and 47*b* which are located near the hydraulic cylinders. Alternatively, it may be used in addition to the accumulators near the cylinders to provide a softer bounce stiffness of the support means. If it is used in addition, it may be preferable to lock out the accumulator from the system under certain conditions to improve the control of the suspension system. For example, since the accumulator adds resilience into the system, it can be used to give a soft, comfortable bounce rate whilst the vehicle is travelling at a constant speed. When acceleration or braking is taking place, the resulting squat or dive may be reduced by stiffening up the bounce stiffness of the support means by locking out the central accumulator 47*e*. By monitoring the pitch motions (displacements and/or accelerations, etc) of the vehicle the accumulator may be locked out temporarily as required to improve the pitch control of the suspension system. This accumulator 47*e* may also (or alternatively) be provided with a damper or variable restrictor. The variable restrictor may be used to control pitch in a similar manner to the lockout valve.

The combined support system shown at the rear of FIG. 7 comprises a pair of interconnected hydraulic cylinders 45*c* and 45*d*, similar to those shown at the front, but in this case they are used in parallel with conventional coil springs 51*c* and 51*d*. The coil springs may carry, for example, half of the rear weight of the vehicle in the static unladen condition. The hydraulic cylinders (45*c* and 45*d*) carry the remainder of the rear weight. If a levelling system is used on the rear hydraulic cylinders, as more weight is added to the rear of the vehicle and fluid is supplied to the cylinders (45*c* and 45*d*) to maintain the same level, the coil springs (51*c* and 51*d*) remain at the same compression, so still only carry half of the unladen weight of the rear of the vehicle. Therefore the hydraulic cylinders then have to carry all of the increase in load in addition to half of the unladen weight of the rear of the vehicle. In designing the hydraulic cylinders such that the pressures do not reach excessive levels when the vehicle is operating in the fully laden condition, the pressures when unladen are usually relatively low, which reduces the level of seal friction in the cylinders and therefore improves the ride of the vehicle in the unladen condition. The sizing of the cylinders and the portion of the static weight of the vehicle that they carry, is usually chosen in dependence on the range of design loads for the vehicle, the acceptable level of cylinder seal friction (especially at the most commonly used load condition) and the maximum acceptable hydraulic pressures statically (for the supply system) and dynamically.

The hydraulic cylinders may be interconnected in the same manner as shown and described for the front of the vehicle. This may include accumulators 47*c* and 47*d* mounted on to the cylinders 45*c* and 45*d* or close by on the interconnecting pipe 49. The optional damper, variable restrictor or lockout block 50 is shown corresponding to the front unit numbered 48, as is the central accumulator 47*f*.

The rear hydraulic system preferably includes some or all of the dampers, restrictors and lockouts described for the front support means, since the coil springs must be damped. Alternatively, or additionally separate conventional or controlled dampers may be provided for each wheel.

In the above description, the hydraulic cylinders are single acting, which is often preferable for cost, size, weight and friction reduction reasons. However, to gain better control of rise of the associated portion of the body under reducing load (such as at the rear under braking for example), an equivalent double acting cylinder arrangement may be utilised.

Any form of the roll attitude control mechanisms disclosed herein may be used in combination with the above described support means. The support means may be independent at one end of the vehicle and a combined arrangement at the rear, and may also be constructed in a variety of ways to achieve substantially equivalent results. For example the coil springs could be replaced by leaf springs or torsion bars, and the hydraulic cylinders may be replaced by air bags or other fluid or mechanical laterally interconnected arrangements providing a degree of support with minimal roll stiffness.

Figure 8:
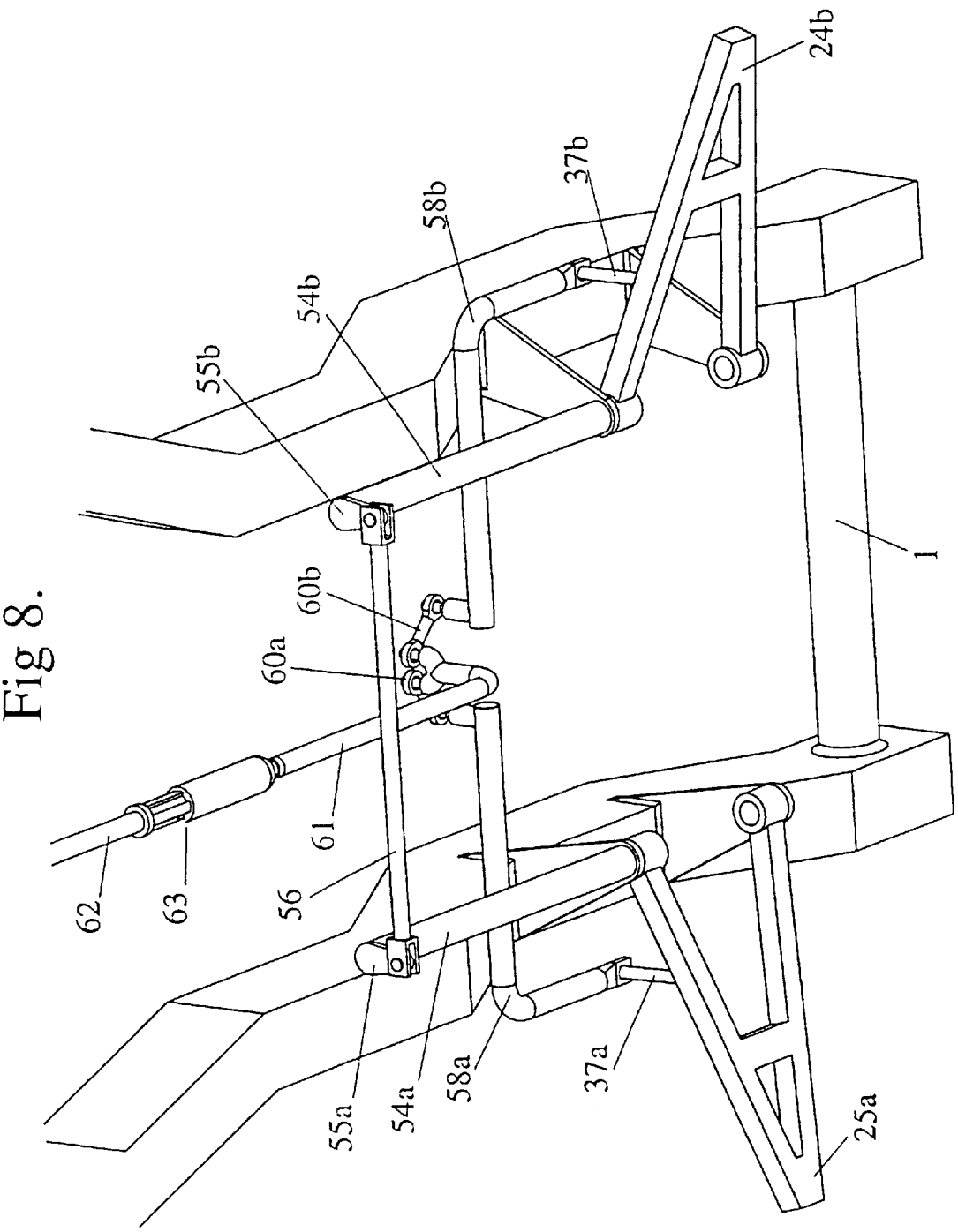
FIG. 8 shows a sixth, entirely mechanical embodiment of the suspension system according to the present invention.

FIG. 8 shows one such mechanical alternative form of support means and an alternative roll moment reaction means, in this case mechanical, fitted to the front of a chassis 1 similar to that of the previous figures. The mechanical support means includes respective left and right hand front support torsion bars 54*a* and 54*b*, which may be driven directly from the suspension arm pivot as shown. Alternatively, the support torsion bars may be driven by a lever arm and drop link or off the suspension arm pivot point through a form of universal joint type arrangement allowing the axis of the torsion bar to differ from the axis of rotation of the suspension arm. If the lever arm and drop link arrangement is used, the position of the joints can be chosen to vary the load input to the torsion bar with wheel position, enabling a variable rate suspension to be designed through link geometry. Rigidly connected to the opposite end of the support torsion bars are lever arms 55*a* and 55*b*, said lever arms being interconnected by the front support connecting bar 56. The lever arms 55*a* and 55*b* are shown directed down towards the ground, loading the front support connecting bar 56 in tension. An alternative embodiment is to direct the lever arms upwards thereby loading the front support connecting bar 56 in compression. To provide a ride height adjustment for the front of the vehicle, the front support connecting bar 56 may be lengthened or shortened either manually or automatically by any known means. Height adjustment means may similarly be provided for the rear of the vehicle.

Resilience may be provided in the above described mechanical front support means by any known means such as making the support torsion bars 54*a* and 54*b* resilient and/or replacing the front support connecting bar 56 with a spring arrangement.

Figure 9:
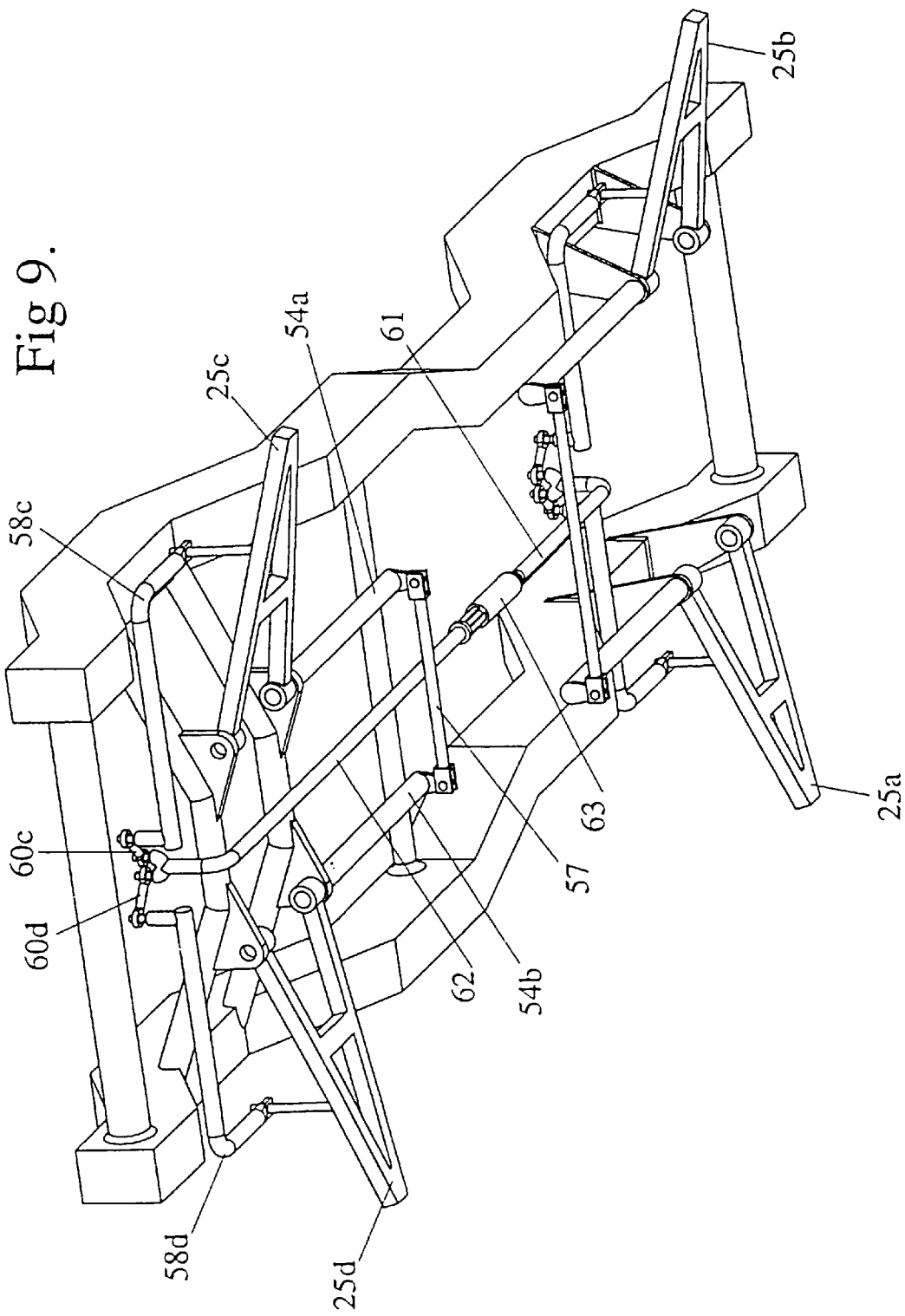
FIG. 9 is an enlarged view of one end of a chassis fitted with the sixth embodiment of the suspension system.

The mechanical roll moment reaction means shown in FIGS. 7, 8 and 9 is functionally similar to the previously described hydraulic roll moment reaction means and similarly includes front and rear roll attitude control mechanisms. The front roll attitude control mechanism shown in detail in FIG. 8 includes two lateral torsion bars 58*a* and 58*b*, each actuated by their associated suspension arm 25*a* or 25*b*, via the drop links 37*a* and 37*b* and the lever arms integrally formed at the outer ends of the bars. The inner ends of the lateral torsion bars 58*a* and 58*b* are provided with shorter lever arms 59*a* and 59*b* which have connecting links 60*a* and 60*b* rotatably joined to them. The connecting links are in turn joined to a common front roll attitude bar 61 which is rotatably mounted to the chassis 1 such that it can rotate about its major axis aligned longitudinally along the chassis. As roll or articulation motions cause one front suspension arm to raise with respect to the vehicle chassis and the other suspension arm to lower, the front roll attitude bar 61 rotates about its major axis.

FIG. 9 shows the front and rear mechanical roll attitude control means fitted to a chassis and connected from to rear by the front and rear roll attitude bars 61 and 62 such that roll motions are resisted and articulation motions are freely permitted. To prevent the mechanical roll moment reaction means from limiting the pitch motions of the chassis, the overall length of the front and rear roll attitude bars 61 and 62 must be variable, so a splined connection 63 is provided between said bars which can transmit the torque in the bars.

Figure 10:
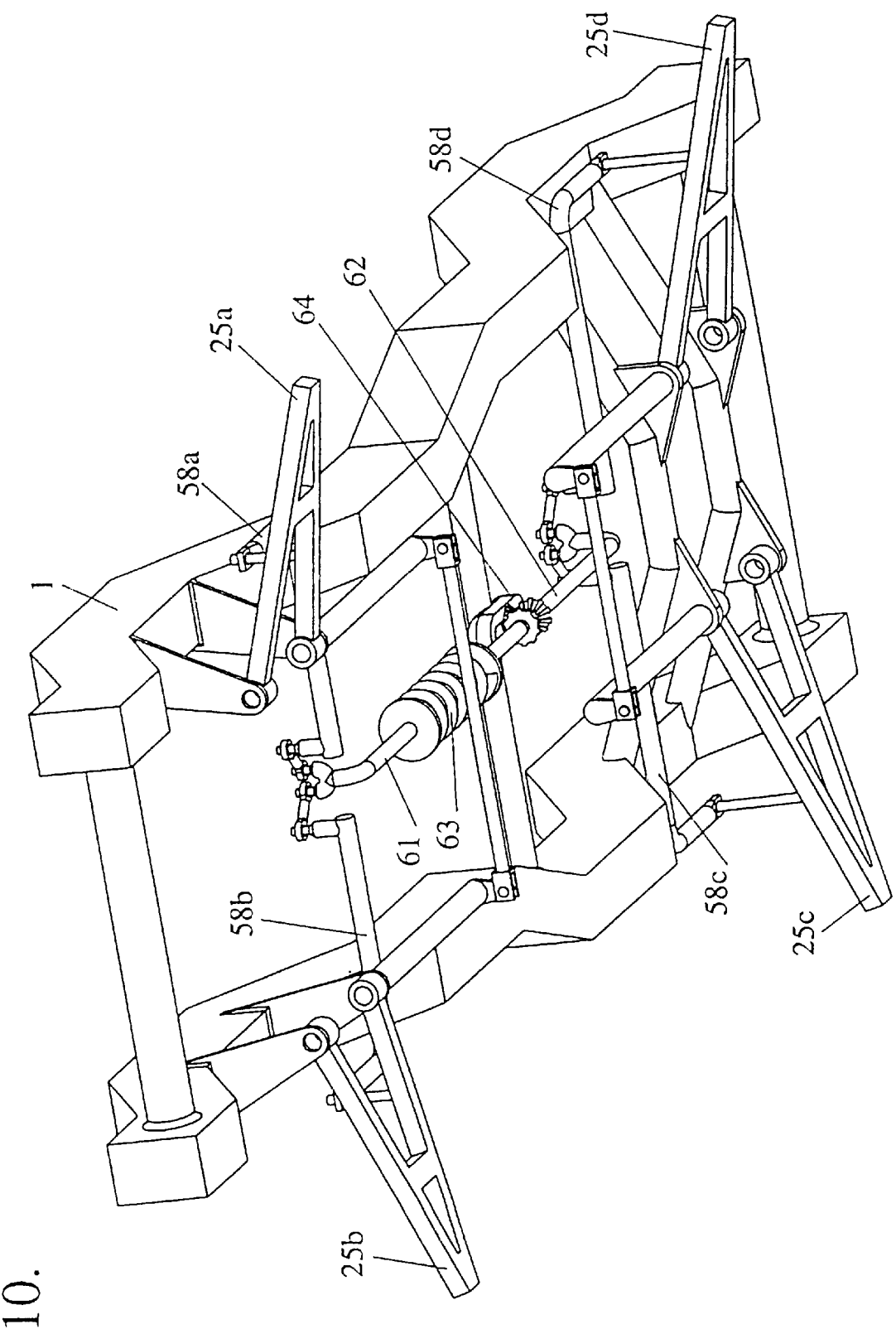
FIG. 10 shows a modification to the sixth embodiment of the suspension system.

FIG. 10 shows a further modification to the mechanical roll moment reaction means. The lateral torsion bars 58c and 58d of the rear roll attitude control means are repositioned forward of the rear suspension arms 25c and 25d and a spring and damper are added to the splined connection 63. This affords a degree of pitch coupling control such that for example as the front wheel are pushed upwards towards the chassis by a bump, the rear wheel can be pushed downwards away from the chassis. The level of pitch coupling can be tuned by changing the spring and damper rates of the splined connection unit 63. To ensure that the roll and articulation motions of the wheel relative to the chassis are still correctly controlled, a rotation reversal mechanism 64 is also required in one of the roll attitude bars 61 or 62. The rotation reversal mechanism 64 shown in FIG. 10 is a differential type unit which is slidably mounted to the chassis to permit the roll attitude bars 61 and 62 to move longitudinally as required.

Figure 11:
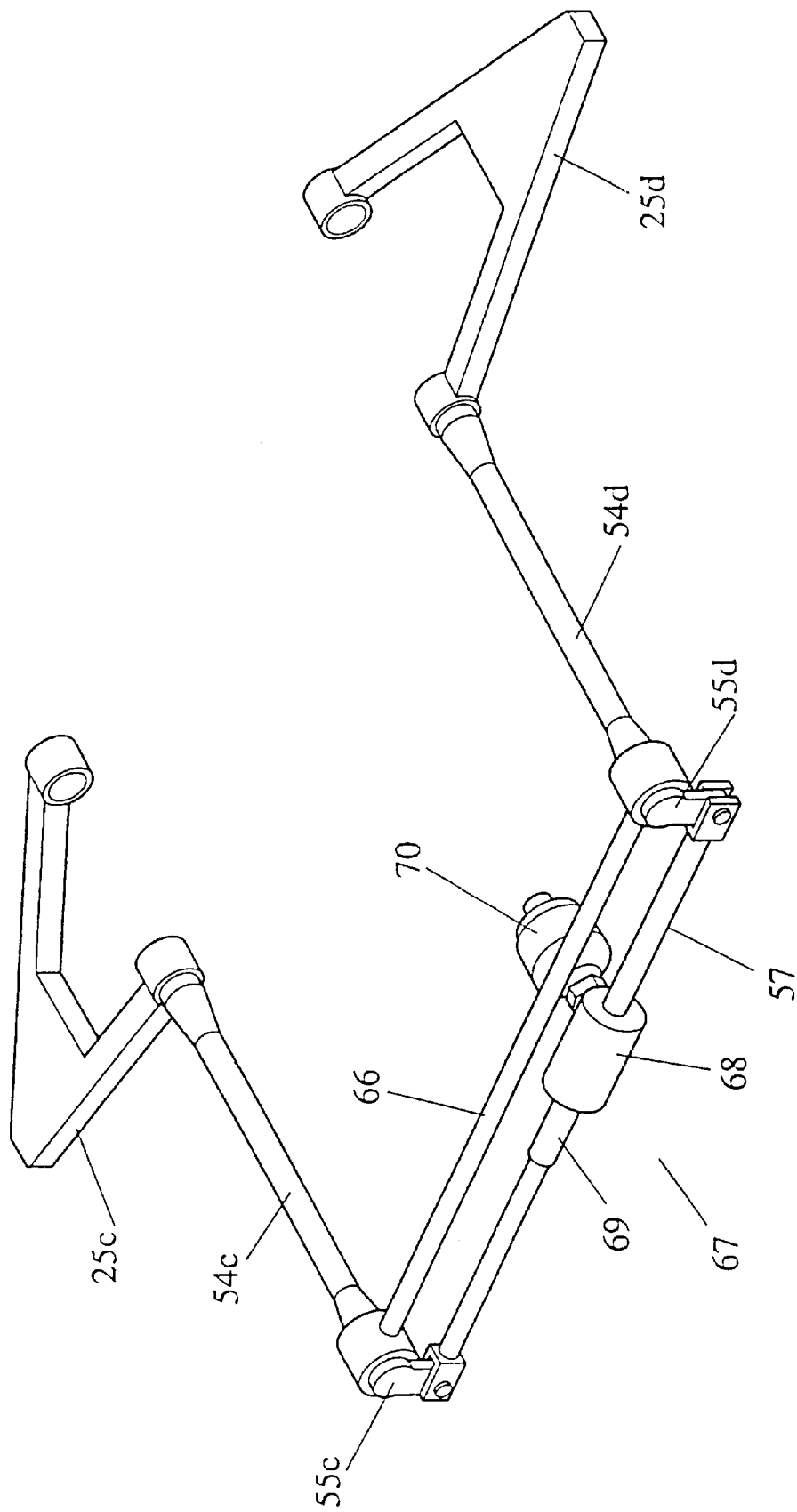
FIG. 11 illustrates a possible improvement to the support means shown in FIG. 8 according to the present invention.

FIG. 11 shows improvements to the interconnected torsion bar vehicle support means introduced in FIGS. 8 and 9. The support means introduced in FIGS. 8 and 9. The support means for only the rear pair of laterally spaced wheels are illustrated, viewed from the front of the vehicle, with other parts such as the roll attitude control mechanism, the chassis and wheels omitted for clarity. The arrangement is very similar to that shown in FIG. 9, except that a force resolving link 66 holds the ends of the support torsion bars (54c and 54d) together and the rear support connecting link 57 includes an hydraulic cylinder 67 with an optional accumulator 70. The use of the force resolving link 66 enables the lateral forces on the ends of the torsion bars (due to the action of the connecting link 57) to be resolved within the suspension system and not into the vehicle body or chassis structure. This can reduce vehicle weight and harshness since the vehicle body does not receive the high loads normal in conventional torsion bar suspensions necessary to react each torsion bar independently.

The hydraulic cylinder assembly 67 may be used for ride height adjustment as previously described for FIG. 8 by changing the length of the support connecting link 57.

Also, if the optional accumulator 70 is included, the cylinder assembly may provide additional bounce resilience in series with torsion bars 54c and 54d. As with the central accumulator in FIG. 7, the accumulator 70 may be used to soften the bounce stiffness of the support system and controlled tp provide variable bounce stiffness rates. For example, if the packaging of a vehicle dictates that the torsion bars be too short to be able to provide the desired degree of resilience with an acceptable stress level, the addition of the accumulator 70 may permit the desired amount of resilience to be attained within the available package envelope.

Also, the accumulator 70 may be used in conjunction with the cylinder assembly 67 as the sole source of resilience of the associated support system if the torsion bars are effectively omitted. Similarly, the cylinder assembly may be replaced by a purely mechanical system such as a coil spring actuated by lever arms driven by the suspension arms. As above, the torsion bars may be retained or omitted depending on packaging constraints.

The cylinder 67 may be double or preferably single acting. As with the arrangement shown in FIG. 7 with a hydraulic cylinder at each wheel, a double-acting arrangement has some benefits, especially in the control of rebound motions, but for increased cost and complexity.

The cylinder assembly 67 may preferably include a form of damping such as a restriction between the cylinder barrel 36 and the accumulator 38. The restriction may be variable. Additionally or alternatively, a lockout may be provided to isolate the cylinder from the accumulator, thereby locking the cylinder at a fixed length. The variable restriction and lockout may be electronically controlled in dependence on the sensed dynamic motions of the vehicle body, wheel motions, steering and speed signals, vehicle load or other inputs to a controller. The control could be much simpler such as a driver operated switch to choose between different levels of ride comfort and primary body control.

Figure 12:
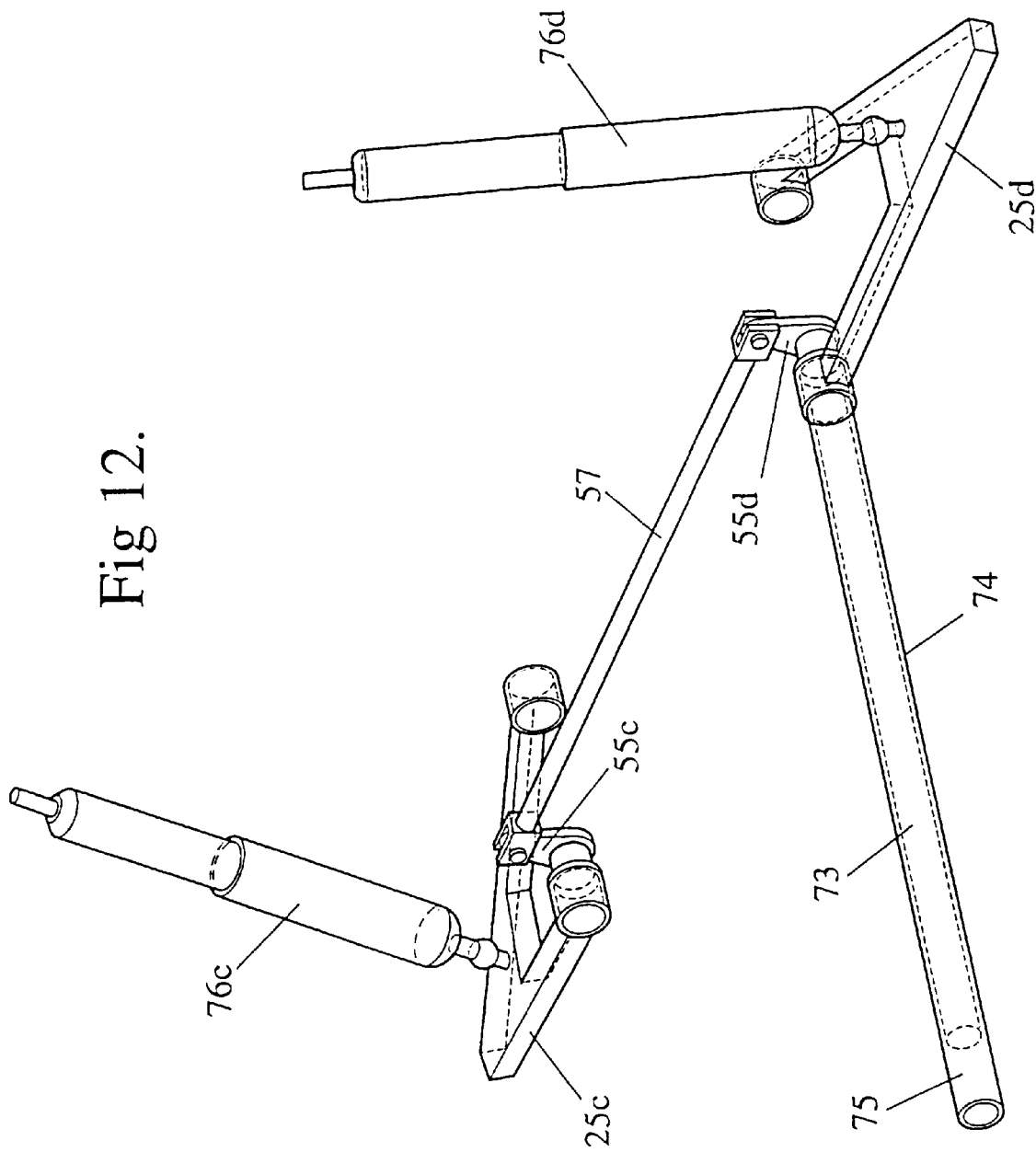
FIG. 12 shows another modification to the support means in FIG. 8.

Referring now to FIG. 12, an alternative mechanical bounce support arrangement is illustrated applied to the rear pair of transversely adjacent of wheels with the vehicle chassis and the roll attitude control components omitted for clarity. The back right wishbone 25c has a first bounce lever arm 55c rigidly attached close to the axis of rotation of the wishbone. a bounce tube 74 is rigidly attached close to the axis of rotation of the wishbone. A bounce tube 74 is rigidly attached to the back left wishbone 25d with the bounce torsion bar 73 attached to the tube at one end 75 by any known means such as a spline and extending back up inside the tube. The other end of the bounce torsion bar 73 back at the wheel end is connected to the second bounce lever arm 55d. The first and second bounce lever arms are interconnected as before by the support connecting link 57.

Thus the torsion bar is loaded by the left wheel at its forward end 75 and loaded in the opposite direction by the right wheel at its rearward end providing resilient bounce support of the vehicle body. As the vehicle wheels move with respect to the body in roll or cross-axle articulation motions, the bounce lever arms, tube and torsion bar rotate, the support connecting link moves in a substantially lateral direction thereby substantially maintaining the same torque in the bounce torsion bar and consistent loading on the vehicle wheels.

Alternative height control means are also shown in FIG. 12 in the form of self-levelling dampers 31 and 32 are shown to help maintain vehicle ride height under differing load conditions.

The torsion bar arrangement has particular application on the rear suspension of vehicles as it may be possible to package the bounce torsion bar on one side of the vehicle only, the remainder of the space often being occupied by fuel tanks and exhaust system components. It is not necessary to rigidly fix the first bounce lever arm and the bounce tube to the respective wishbones, they being driven by intermediate linkages if desired.

The above "torsion bar within a tube" design may be used on both sides of the vehicle, with optionally, different length torsion bars from side to side if required. The cylinder arrangement 67 shown in the support connection bar 57 in FIG. 11 may also be incorporated into the similar support connection bar 57 in FIG. 12 as may the force resolving link 66, also shown in FIG. 11.

Another alternative known arrangement of bounce support means with substantially no roll stiffness is to provide two lateral torsion bars, usually actuated by the suspension arms via lever arms and drop links, and joined together by some form of contra-rotation device such as a pair of spur gears or a differential type unit with its outer cage fixed to the vehicle chassis as in other known suspension systems such as those disclosed in the applicant's U.S. application no.

There are too many other known different forms of laterally interconnected vehicle support means to list within this specification. Any vehicle support means with low roll stiffness could possibly be used in the present invention to achieve the same results. Using any form of vehicle support means having a low or negligible roll stiffness, in combination with a separate roll moment reaction means having longitudinally interconnected lateral torsion bars to produce a low or negligible cross-axle stiffness is considered to be within the scope of this invention. This concept can be easily packaged in most modern vehicles and improves the ride comfort, traction and control of the vehicle both on and off road.

To illustrate the point, another example of a suitable form of laterally interconnected support means will be briefly described. One commonly shown in suspension design text books is the 'Z-beam'. This is a single bounce support torsion bar running at an angle across the vehicle, mounted in front of the axle line of one wheel and behind the axle line of the laterally adjacent wheel. Actuating lever arms extend from the ends of the bar to the respective wheel assemblies such that the ends of the bar are wound in opposite directions with motions of the respective wheels in the same direction, thereby providing bounce support with substantially no roll stiffness.

Figure 13:
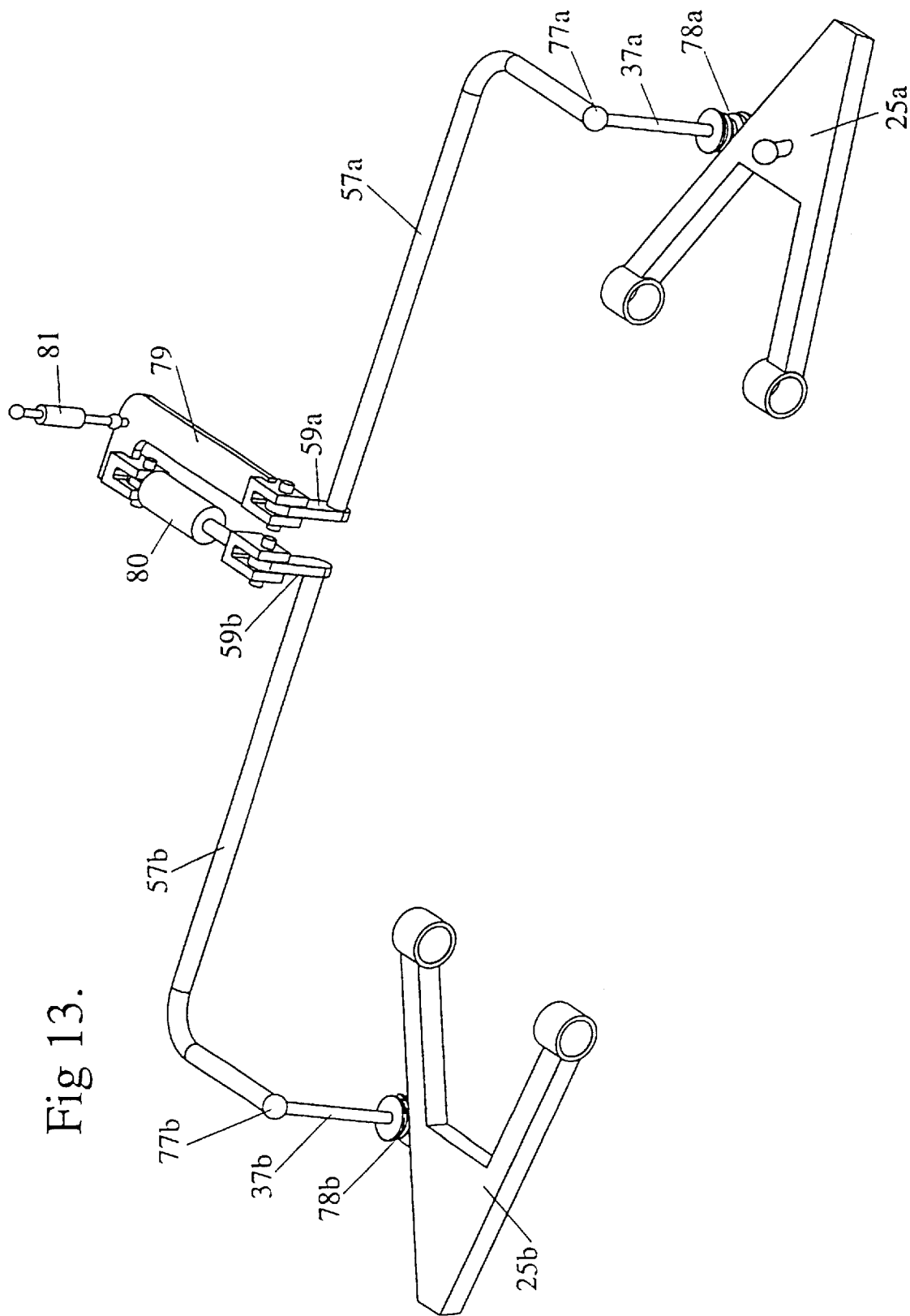
FIG. 13 is a view of an alternative arrangement of the roll attitude control mechanism applied to the forward pair of laterally spaced wheels.

FIG. 13 shows an alternative arrangement of the roll moment reaction means connected to the front wishbones 25*a* and 25*b*. The other components including the support means, have been omitted for clarity. The anti-roll bar is split into two portions, 57*a* and 57*b*, the split being shown in the centre of the bar. However, it should be appreciated that as with the similar mechanical arrangement shown in FIG. 8, the split can be located at any point along the length of the anti-roll bar.

The outer end of each anti-roll bar is angled forwards and connected to a dropper (37*a* and 37*c*) by a ball joint (77*a* and 77*b*). The lower end of each dropper is connected to the respective wishbone through a joint 78*a* and 78*b* which includes washers retaining rubber bushes between the dropper and the mounting plate on the wishbone. In order to gain additional initial roll resilience, stiffening up with increasing roll moment, the washers may be shaped cups into which the rubber bushes fit. The rubber bushes may be shaped to provide a low stiffness in their initial compression, rising to a very high stiffness above a certain deflection when they are compressed to occupy a substantially all the available volume in the shaped cups. The washers may formed the shaped cups, with the mounting plate on the wishbone having a domed profile to control the way the rubber bushes deflect under load. Alternatively the shaped cups may be fixed to the mounting plate on the wishbone with the washers on the dropper being dome shaped to perform as desired. This technique is similar to that used for the joints at the ends of conventional automobile dampers for reducing harshness.

At the inner end of each anti-roll bar half, respective roll lever arms 59*a* and 59*b* extend substantially perpendicular to the bars. One of the roll lever arms is pivotally connected to a cradle 79 and the other is connected to a roll cylinder 80, which is hydraulically connected to a rear roll cylinder in a similar manner to the roll cylinders 13*a* in FIG. 1 and 40 in FIG. 5, using an upper and a lower conduit (not shown). The other end of the roll cylinder 80 is pivotally connected to the cradle 79 such that relative motion of the front left wishbone with respect to the front right wishbone will cause the roll cylinder 80 to extend or contract thus the roll moment reaction means operates as previously described. The cradle 79 and cylinder 80 are free to rotate about an axis through the pivot points on the roll lever arms (59*a* and 59*b*) so a locating link 81 is provided to position the cradle and cylinder between the anti-roll bars (57*a* and 57*b*) and the chassis or body. If the major axis of the cylinder and the cradle are not positioned perpendicular to the roll lever arms (59*a* and 59*b*), geometry effects cause the mechanical advantage of the roll cylinder over the front wheels to change, altering the roll moment distribution of the roll moment reaction means. If the locating link 81 is of fixed length, as the vehicle bounces, the anti-roll bars rotate and the roll moment distribution changes. This can be used to change the roll moment distribution with load (if the bounce support means do not include levelling).

Alternatively the locating link 81 may be of a controllable variable length, such as an electrically operated worm-drive, a hydraulic cylinder or any other known-means. As the link is only used to partially support the mass of the roll cylinder 80 and cradle 79, the load in the link is low enabling a variety of options to be considered.

Alternative roll moment reaction means which exhibit the same characteristics as the specific embodiments described in detail herein, of passively providing roll stiffness and allowing free cross-axle articulation with substantially no change in the loading on each wheel in low speed articulation motions (and whereby the vehicle roll stiffness is substantially unaffected when the wheels are in large displacement cross-axle articulation positions) may also be substituted.

One basic alternative is to pre-charge the fluid in the roll cylinders and their front to rear conduits. This can increase roll control and may introduce harshness due to the striction of the pressurised fluid seals. Also if the roll cylinders are pressurised it may be preferable that the cylinder rods extend through both end walls of the cylinder, thereby preventing uneven wheel loading statically on level ground.

Conventional anti-roll bars may be used with the double acting roll attitude cylinders being repositioned in place of one of the front and one of the rear drop links in a known arrangement.

The lateral roll attitude torsion bars may be divided into two in the centre of the vehicle and provided with lever arms at both ends. The double acting roll attitude cylinders may then be repositioned between the central lever arms of the roll attitude torsion bars in a known design such as in the aforementioned PCT/AU96/00528 to perform the same function as described in the earlier text.

Similarly, rotary actuators may be used between a pair of lateral roll attitude torsion bars at one or both ends of the vehicle.

Conventional anti-roll bars may be used with four single acting roll attitude cylinders replacing all of the front and rear roll bar drop links in a known arrangement. Each front cylinder is linked to the rear cylinder on the same side of the vehicle. Alternatively this single acting arrangement may be used for the roll attitude control mechanism on one end of the vehicle with any form of double acting arrangement being used on the opposite end, including a rotary actuator.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A suspension system for a vehicle having a chassis supported on at least one forward pair of laterally spaced wheels and at least one rear pair of laterally spaced wheels, including:

vehicle support means for supporting the chassis above each said pair of wheels, and roll moment reaction means for providing location of the chassis about a substantially level roll attitude, said roll moment reaction means including a respective roll attitude control mechanism for each pair of at least two said pairs of laterally spaced wheels for passively controlling the position of the wheels relative to each other and the chassis, each roll attitude control mechanism being connected to at least one other roll attitude control mechanism by roll mechanism interconnection means, said roll mechanism interconnection means being arranged such that the roll moment reaction means resists roll of the vehicle chassis with respect to the wheels, whilst simultaneously permitting cross-axle articulation motions of the wheels, wherein at least one of the roll attitude control mechanisms includes at least one transverse torsion bar, the vehicle support means for at least one pair of wheels includes at least a first support means for supporting at least a portion of the load on said vehicle support means, said first support means providing substantially zero roll stiffness for the vehicle, the roll moment reaction means being separate from the vehicle support means thereby providing substantially zero load carrying capacity.

2. A suspension system according to claim 1 wherein the vehicle support means for at least one pair of laterally spaced wheels provides substantially zero roll stiffness.

3. A suspension system according to claim 1 wherein the vehicle support means for each said pair of wheels provides substantially zero roll stiffness, thereby providing substantially equal wheel loading for non-dynamic wheel displacements, regardless of the cross-axle articulation, up to the limit of travel of at least one of the vehicle support means or the roll moment reaction means.

4. A suspension system according to claim 1 wherein the vehicle support means for at least one pair of wheels further includes additional independent second support means, the second support means including resilience and being arranged to provide a degree of support and a degree of roll stiffness for the vehicle.

5. A suspension system according to claim 1 wherein each roll attitude control mechanism includes at least one adjustment means to enable the position of one of the associated wheels to be adjusted with respect to the position of the other wheel in an opposing direction thereof, the adjustment means of one said roll attitude control mechanism being interconnected with the adjustment means of another said roll attitude control mechanism by the roll mechanism interconnection means such that the relative positions of said one pair of laterally spaced wheels are adjustable in an opposing direction to the relative positions of the other said pair of laterally spaced wheels.

6. A suspension system for a vehicle having a chassis supported on at least one forward pair of laterally spaced wheels and at least one rear pair of laterally spaced wheels, including vehicle support means for supporting the chassis above each said pair of wheels, the vehicle support means for at least one pair of wheels including at least a first support means to support at least a portion of the load on the vehicle support means said first support means providing substantially zero roll stiffness for the vehicle, and roll moment reaction means separate from the vehicle support means for providing location of the chassis about a substantially level roll attitude to thereby resist roll of the chassis with respect to the wheels while simultaneously permitting cross-axle articulation motions of the wheels, said roll moment reaction means providing substantially zero load carrying capacity for the vehicle, wherein the roll moment reaction means includes a roll attitude control mechanism for each pair of at least two pairs of laterally spaced wheels, said roll attitude control mechanism including at least one transverse torsion bar and an adjustment means to enable the position of one of the associated wheels to be adjusted with respect to the position of the other wheel in an opposing direction thereof, the adjustment means of one said roll attitude control mechanism being interconnected with the adjustment means of another said roll attitude control mechanism by a roll mechanism connection means, such that the relative positions of said one pair of laterally spaced wheels are adjustable in an opposing direction to the relative positions of the other said pair of laterally spaced wheels.

7. A suspension system according to claim 6 wherein the first support means includes a load support device for each wheel, the load support devices for a laterally spaced pair of wheels being interconnected by a support interconnection means such that as one of said wheels is displaced upwards with respect to the chassis, the other wheel is urged downwards.

8. A suspension system according to claim 7 wherein the support interconnection means provides a degree of resilience such that the first support means provides resilient support of the vehicle chassis while introducing substantially zero roll stiffness.

9. A suspension system according to claim 7 wherein at least one of the load support devices provides a degree of resilience such that the first support means provides resilient support of the vehicle chassis while introducing substantially zero roll stiffness.

10. A suspension system according to claim 7 wherein the load support devices are in the form of extensible and retractable fluid containers, the support interconnection means being a conduit interconnecting the fluid containers to provide fluid communication therebetween.

11. A suspension system according to claim 10 further including an accumulator means in fluid communication with the conduit interconnecting the fluid containers, for providing at least part of the resilience of the first support means, and flow control means between the conduit and the accumulator means for controlling fluid flow therebetween.

12. A suspension system according to claim 10 further including at least one flow control means on the conduit for controlling fluid flow therethrough.

13. A suspension system according to claim 12, the flow control means including an accumulator means for providing at least part of the resilience of the interconnected first support means.

14. A suspension system according to claim 6, further including for at least one said pair of laterally spaced wheels having interconnected first support means, additional independent second support means for each wheel, the second support means including resilience, to thereby provide a roll stiffness for the vehicle.

15. A suspension system according to claim 14 wherein the second support means is in the form of a spring.

16. A suspension system according to claim 6, the chassis being supported above the respective wheels by the vehicle support means acting on respective suspension arms provided for each wheel, the vehicle support means for at least one said pair of laterally spaced wheels including a load support device respectively provided for each suspension arm for supporting at least a portion of the load on the respective vehicle support means, wherein at least one of the load support devices includes a torsion bar rotatably located at one end by the associated suspension arm, the other end having a support lever arm rigidly connected thereto, a support interconnection means pivotally connected at one end to the support lever arm of the load support device for one wheel of the laterally spaced pair, the other end of the support interconnection means being pivotally connected to a support lever arm included in the load support device of the other laterally spaced wheel.

17. A suspension system according to claim 16 wherein each of the load support devices includes a substantially longitudinally aligned support torsion bar driven at one end by the associated suspension arm, the other end having a support lever arm rigidly connected thereto, the support interconnection means being a link having its ends pivotally connected to said support lever arms of the load support device for each wheel of the laterally spaced pair.

18. A suspension system according to claim 16 wherein the torsion bar is rotatably located to the associated suspension arm by a bounce tube, said bounce tube being connected to and extending from said associated suspension arm at one end, the other end of the bounce tube being rigidly connected to the torsion bar, said torsion bar being located inside the bounce tube and protruding out of the end by the suspension arm, the protruding end of the torsion bar having the support lever arm rigidly connected thereto.

19. A suspension system according to claim 16 wherein the link forming the support interconnection means includes support adjustment means for varying the length of said link to thereby vary the height of the vehicle.

20. A suspension system according to claim 19 wherein the support adjustment means includes an hydraulic cylinder.

21. A suspension system according to claim 20 further including an accumulator in fluid communication with the hydraulic cylinder.

22. A suspension system according to claim 21 including a flow control means for controlling the fluid communication between the hydraulic cylinder and the accumulator.

23. A suspension system according to claim 16 wherein an additional force resolving link is pivotally connected to the support lever arm of each load support device, such that the force resolving link acts parallel to the support interconnection means thereby substantially resolving the lateral loads in the support interconnection means within the vehicle support means.

24. A suspension system according to claim 6 wherein each adjustment means includes a double-acting hydraulic cylinder, the adjustment means being arranged such that the hydraulic cylinder is urged to extend and contract as one wheel of the associated laterally spaced pair moves in substantially the opposite direction to the other wheel relative to the chassis, and the roll mechanism interconnection means between the adjustment means of at least two roll attitude control mechanisms being two fluid conduits interconnecting the double-acting hydraulic cylinders such that roll motions tend to generate pressure in one of the fluid conduits thereby transmitting the roll forces into the transverse torsion bars to react at least a portion of the roll moment on the chassis, and articulation motions cause one cylinder to extend and the other to contract, generating a fluid flow between the cylinders.

25. A suspension system according to claim 24 wherein at least one of the fluid communicating conduits interconnecting the hydraulic cylinders further includes flow control means for controlling the fluid flow through said conduit.

26. A suspension system according to claim 24 wherein the hydraulic cylinder of at least one of the adjustment means is located between the end of the transverse torsion bar and the wheel such that as one wheel moves in the opposite direction to the other, the cylinder is urged to extend and contract.

27. A suspension system according to claim 24 wherein the transverse torsion bar is interconnected at one end thereof to one wheel, the other end of the torsion bar being connected to the adjustment means which in turn is interconnected to the other wheel, the adjustment means including a cradle which is rotatably connected to the end of the torsion bar and interconnected to the wheel, the hydraulic cylinder being connected between the cradle and a lever arm formed on the end of the torsion bar, such that as the cylinder extends and retracts, one wheel is urged to move in substantially the opposite direction to the other wheel with respect to the chassis.

28. A suspension system according to claim 24 wherein the roll attitude control mechanism includes two aligned transverse torsion bars, one for each wheel, having lever arms at their inner ends, the bars being interconnected by the adjustment means including the hydraulic cylinder pivotally connected to one said torsion bar lever arm, a cradle pivotally connected to the other said torsion bar lever arm and to the hydraulic cylinder, and a locating link for locating the cradle relative to the chassis.

29. A suspension system according to claim 28 wherein the locating link may be of variable length for controlling the position of the cradle relative to the chassis.

30. A suspension system according to claim 6 wherein the roll attitude control mechanism for each pair of wheels includes two aligned transverse torsion bars interconnected by the adjustment means, one associated with each wheel, the adjustment means being in the form of a mechanical linkage arrangement for linking the two torsion bars to one end of a roll attitude bar, the other end of the roll attitude bar being connected to the mechanical linkage arrangement of the other roll attitude control mechanism, such that rotation of the aligned transverse torsion bars in a common direction results in axial displacement of the roll attitude bar, and rotation of the aligned torsion bars in opposing directions results in an axial rotation of the roll attitude bar.

31. A suspension system according to claim 30 wherein the roll attitude bar includes a splined connection to allow the length of the roll attitude bar to vary such that pitch motions of the vehicle are passively permitted.

32. A suspension system according to claim 31 wherein the roll attitude bar further includes resilient and pitch damping means for providing a degree of pitch coupling control.

33. A suspension system according to claim 25, wherein the flow control means comprises a valve located on each said fluid conduit for blocking the flow of fluid therethrough during predetermined vehicle operating conditions.

* * * * *